United States Patent
Lee et al.

(10) Patent No.: US 7,228,008 B2
(45) Date of Patent: Jun. 5, 2007

(54) METHOD FOR SCALING A DIGITAL IMAGE IN AN EMBEDDED SYSTEM

(75) Inventors: Hwa-Soon Lee, Seoul (KR);
Seung-Cheol Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 839 days.

(21) Appl. No.: 10/395,918

(22) Filed: Mar. 24, 2003

(65) Prior Publication Data
US 2004/0052432 A1     Mar. 18, 2004

(30) Foreign Application Priority Data
Sep. 17, 2002 (KR) .................... 10-2002-0056555

(51) Int. Cl.
G06K 9/32 (2006.01)
H04N 1/393 (2006.01)
G09G 5/00 (2006.01)
H04N 1/40 (2006.01)

(52) U.S. Cl. ................... 382/298; 382/299; 358/451; 345/660

(58) Field of Classification Search ............... 382/298, 382/293, 299; 345/660, 665, 667, 668, 669, 345/670; 358/528, 443, 451
See application file for complete search history.

(56) References Cited
U.S. PATENT DOCUMENTS 5,864,329 A * 1/1999 Hirokawa .................. 345/625
6,347,151 B1 * 2/2002 Takahashi et al. ........... 382/166
6,825,857 B2 * 11/2004 Harasimiuk ................. 345/660
7,009,626 B2 * 3/2006 Anwar ........................ 345/660
2006/0023968 A1 * 2/2006 Prakash ...................... 382/298

* cited by examiner

Primary Examiner—Yon J. Couso
(74) Attorney, Agent, or Firm—The Farrell Law Firm

(57) ABSTRACT

A digital image scaling method suitable for an embedded system. The digital image scaling method is performed by determining the respective sizes of minimum processing units of a source image and a target image so that the source image and the target image are divided into the same number of minimum processing units in the respective lateral and longitudinal direction according to a scaling ratio of the source image size to the target image size; obtaining integer weight values, each weight value corresponding to each of the points uniformly divided between two adjacent pixels, being a value of the range of $0 \sim 2^n$ (n being a natural number), the sum of the weight values between two adjacent pixels being $2^n$; and producing the target image by obtaining target pixel values of each of the minimum processing units of the target image corresponding to the minimum processing units of the source image by using a source pixel value reflected on a corresponding target pixel value, with the weight value corresponding to the difference with the source pixel.

22 Claims, 16 Drawing Sheets

METHOD FOR SCALING A DIGITAL IMAGE IN AN EMBEDDED SYSTEM

PRIORITY

This application claims priority to an application entitled "Method for scaling digital image in embedded system" filed in the Korean Industrial Property Office on Sep. 17, 2002 and assigned Serial No. 2002-56555, the contents of which are hereby incorporated by reference.

BACKGROUND OF THE INVENTION

1. Field of the Invention

The present invention relates generally to a method for scaling a digital image, and more particularly to a method for scaling a digital image, i.e., for reducing or enlarging the digital image, for display in an embedded system.

2. Description of the Related Art

With the generalization of digital images, various sized and shaped of digital image apparatuses have been commercialized and introduced. A digital image apparatus such as a Digital TV, an HDTV (high definition television), a PDA (personal digital assistant), an IMT-2000 (international mobile telecommunications-2000) terminal, etc., provides clear images which a conventional analog image apparatus does not provide, and also provides various image processing functions, for example, division, enlargement, reduction, smoothing of images, or the like, which are possible only by digital image processing.

Many system sources are required to realize the various digital image processing functions as above. Therefore, in a digital TV, a DVD (digital video disc) player, etc., in which the power supply is sufficient and the size of the apparatus is large enough to realize digital image processing functions, various digital image processing functions can be realized without many difficulties. However, since an embedded system such as an IMT-2000 portable communication terminal station, a PDA, a digital camcorder, etc., is usually small in size, limited in power-supply, small in memory capacity, and the processing speed by its processor is slow, an embedded system has many limitations and many difficulties in realizing a digital image in its functions.

Image scaling technology for enlarging/reducing an image as one of the digital image processing functions is generally employed on an image input from a camera or applied to realize a partial enlargement function or PIP (picture in picture) function in a digital image output apparatus. However, image scaling is one of the most important technologies in solving the problem of interface between a standard video CODEC (coder/decoder) and various-sized LCD (liquid crystal display) devices as color/moving picture portable communication terminals are so common these days. The standard video CODEC is designed to support a QCIF (quadrature common interface format) size of 176× 144. In contrast, the LCD devices are being produced in various sizes for image display according to the size of terminals or their production expenses, and thus, it can be produced in one of any number of sizes, varying from a small size, for example, 128×192, to a large size, for example, 240×240. Accordingly, the LCD devices are required to enlarge or reduce images to display the image output from a standard video CODEC on the image display of an LCD apparatus.

Image scaling technology to enlarge or reduce images as described above, is variegated and very complicated, and many methods of which are known. The variety of the methods result from the fact that the methods for maintaining the characteristics of a source image by enlargement/reduction are so various even when the image size is changed. However, image scaling technology suitable for a system having little system power, such as embedded systems, is not well known. This is due to the general recognition that image scaling technology is not suitable for embedded systems because the realization of the image scaling technology requires many operating processes. In processing in a pixel unit, a significant amount of processing is required in a real-time moving picture display because the image is output at a rate above 10 frames per second. Accordingly, image scaling technology for embedded systems has been neglected in the aspect of hardware because complicated hardware structures and high-powered systems are required to realize the image scaling function, based on the technologies, known up to now.

Further, when realizing an image scaling function through hardware, a flexible interface with applications was difficult to achieve compared with software because the realizing through hardware allows only a few set-up types. Unlike hardware, if realizing an image scaling function through software, various applications are allowed, for example, the control in a pixel unit in the input/output is possible, and there is no constriction in the structure design of application programming for LCD output. Also, image scaling with software provides a flexible interface with any kind of video CODEC and LCD input/output interface. However, the realization of a moving picture is impossible on embedded systems, even these with a considerably high performance chip, because of the large amount of processing.

When considering the above problems, it is preferable to realize the image scaling function on an embedded system through software, but the amount of processing for realization should be small enough not to burden the software. The most simple methods for realizing an image scaling function is that of reducing an image by down-sampling the pixels of a source image according to a scaling ratio and reducing the number of pixels, or that of enlarging an image by simply copying the pixels of a source image and increasing the number of pixels. The above technology can be described as follows in reference to FIG. 1, which illustrates an example of enlarging an image as an up-scaling.

In FIG. 1, to produce 9 enlarged image pixels from 3 source pixels, i.e. producing target pixels P1'~P9' from the source pixels P1~P3, the target pixels P1'~P3' can be produced by copying the source image pixel P1, and the target pixels P4'~P6' can be produced by copying the source image pixel P2, and the target pixels P7'18 P9' can be produced by copying the source image pixel P3. Accordingly, without processing, image size can be increased, but the quality of an enlarged image is significantly deteriorated because it is produced by simply copying the source pixels.

To improve the quality of an enlarged image, there is DDA (digital differential analyzer) algorithm of interpolation, which is processed by providing weight values by as much as a scaling ratio proportional to the image size of a target image to a source image. An example of up-scaling of enlarging images according to DDA algorithm will be described below in reference to FIG. 1. As illustrated in FIG. 1, to produce 9 target pixels P1'~P9' from 3 source pixels P1~P3, the pixel values of target pixels P1'~P9' are in table 1 as follows.

TABLE 1

| | |
|---|---|
| P1' | 1/3 × P1 |
| P2' | 2/3 × P1 |
| P3' | 3/3 × P1 |
| P4' | 2/3 × P1 + 1/3 × P2 |
| P5' | 1/3 × P1 + 2/3 × P2 |
| P6' | 3/3 × P2 |
| P7' | 2/3 × P2 + 1/3 × P3 |
| P8' | 1/3 × P2 + 2/3 × P3 |
| P9' | 3/3 × P3 |

That is, the target pixels P1'~P9' can be produced by multiplying one or two adjacent source pixel values by a gradient (=⅓) which depends on the scaling ratio of the enlarged image size to the source image size and a weight value of a target pixel corresponding to the difference with an adjacent source pixel, and then summing the multiplied values. Accordingly, due to the reflection of adjacent source pixel values of a corresponding source pixel on target pixel values by the interpolation method, the quality of enlarged images are improved compared with the copy of source pixels, but high-quality of enlarged target images still cannot be expected because of simply multiplying the gradient and weight values according to the scaling ratio for source pixel values. Further, as the process includes division processing as well as multiplication processing, it still requires a large amount of processing.

As described above, an image scaling function for an embedded system preferably should be realized by software, and the amount of processing should be small enough to be realized by software. However, the image scaling technology by a small amount of processing still has many problems because the quality of scaled images is deteriorated, and even with the consideration of the image quality deterioration, it requires a large amount of processing. Therefore, the image quality deterioration should be minimized and the amount of processing should be decreased in embedded systems.

SUMMARY OF THE INVENTION

Accordingly, the present invention has been designed to solve the above-mentioned problems occurring in the prior art, and an object of the present invention is to provide a method of scaling a digital image for an embedded system.

Another object of the present invention is to provide a method of scaling a digital image while reducing the amount of processing as well as minimizing the image quality deterioration.

In order to accomplish the above and other objects, there is provided an image scaling method for producing a digital target image by scaling a digital source image in an embedded system, which comprises the steps of: determining respective sizes of minimum processing units of a source image and a target image so that the source image and the target image are divided into a same number of minimum processing units in respective lateral and longitudinal directions according to a scaling ratio of the source image size to the target image size; obtaining integer weight values, each weight value corresponding to each of points uniformly divided between two adjacent pixels, being a value in a range of 0~$2^n$ (n being a natural number), and a sum of the weight values between two adjacent pixels is $2^n$; and producing the target image by obtaining target pixel values of each of the minimum processing units of the target image corresponding to the minimum processing units of the source image by using a source pixel value reflected on a corresponding target pixel value, with the weight value corresponding to the distance with the source pixels.

In accordance with another aspect of the present invention, an image scaling method comprises the steps of: determining respective sizes of minimum processing units of a source image and a target image so that the source image and the target image are divided into a same number of minimum processing units in respective lateral and longitudinal directions according to a scaling ratio of the source image size to the target image size; obtaining integer weight values, each weight value corresponding to each of points uniformly divided between two adjacent pixels, being a value in a range of 0~$2^n$ (n being a natural number), a sum of the weight values between two adjacent pixels is $2^n$; and producing a target image by obtaining target pixel values of each of the minimum processing units of the minimum processing blocks, each of which is formed by multiplying minimum processing unit by the minimum processing unit of the target image, corresponding to each of the minimum processing blocks, each of which is formed as a square with each side being a length of one minimum processing unit of the source image using a source pixel value reflected on a corresponding target pixel value, and the weight value corresponding to a difference with the source pixel.

In accordance with another aspect of the present invention, an image scaling method comprises the steps of: determining respective sizes of minimum processing units of a source image and a target image so that the source image and the target image are divided into a same number of minimum processing units in respective lateral and longitudinal directions according to a scaling ratio of the source image size to the target image size; producing a look-up table by obtaining integer weight values, each weight value corresponding to each of points uniformly divided between two adjacent pixels of the source image, being a value in a range of 0~$2^n$ (n being a natural number), and a sum of the weight values between two adjacent pixels is $2^n$, and by multiplying each of the weight values by each of the pixel values; and producing the target image by obtaining target pixel values of each of the minimum processing units of the target image corresponding to the minimum processing units of the source image by means of processing in reference to the look-up table in order to make the distance with the source image pixel be reflected on the corresponding target pixel values.

In accordance with another aspect of the present invention, an image scaling method comprises the steps of: determining respective sizes of minimum processing units of a source image and a target image so that the source image and the target image are divided into a same number of minimum processing units in respective lateral and longitudinal directions according to a scaling ratio of the source image size to the target image size; producing a look-up table by obtaining integer weight values, each weight value corresponding to each of points uniformly divided between two adjacent pixels of the source image, being a value in a range of 0~$2^n$ (n being a natural number), and a sum of the weight values between two adjacent pixels is $2^n$, and by multiplying each of the weight values by each of pixel values of pixels; and producing a target image by obtaining target pixel values of each of the minimum processing units of minimum processing blocks, each of which is formed by multiplying the minimum processing unit by the minimum processing unit of the target image, corresponding to each of minimum processing blocks, each of which is formed by multiplying the minimum processing unit by the minimum processing unit of the source image by means of processing in reference to the look-up table to correspond to a difference with the source image pixel be reflected on the corresponding target pixel values.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described herein below with reference to the accompanying drawings. In the following description of the present invention, a detailed description of known functions and configurations incorporated herein will be omitted when it may make the subject matter of the present invention rather unclear.

The present invention provides an image scaling method for enlarging or reducing an image, as illustrated in FIG. 2, in which a source image and a target image are divided by a same number of units for each side in both the lateral direction and the longitudinal direction according to a scaling ratio, and a scaling process is sequentially performed on the divided units one by one. The unit of division in the present invention is referred to as a "minimum processing unit," and a block defined by a square with each side being a length of one minimum processing unit of the source image is referred to as a "minimum processing block." The size of the minimum processing unit is determined by the greatest common divisor of the source image and the target image in each of the lateral direction and the longitudinal direction.

Figure 1:
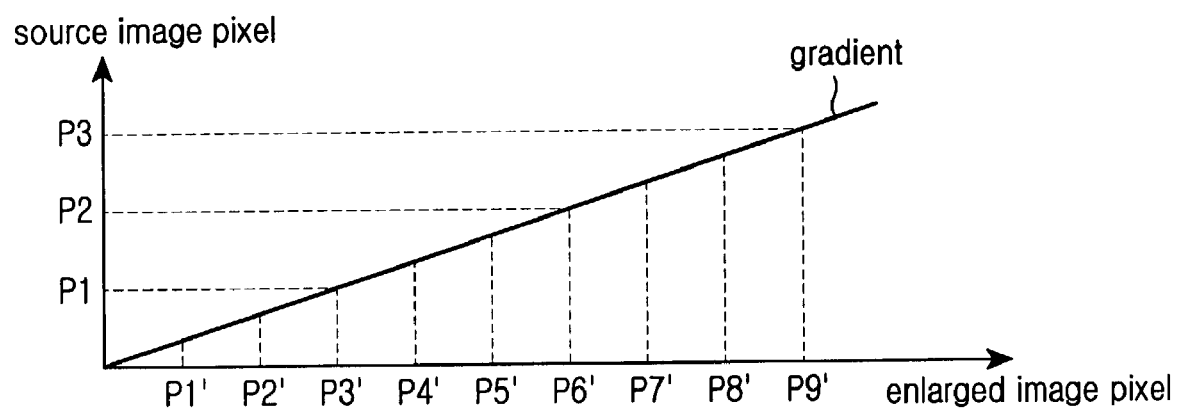
FIG. 1 illustrates an example of a conventional image up-scaling.
Figure 2A:
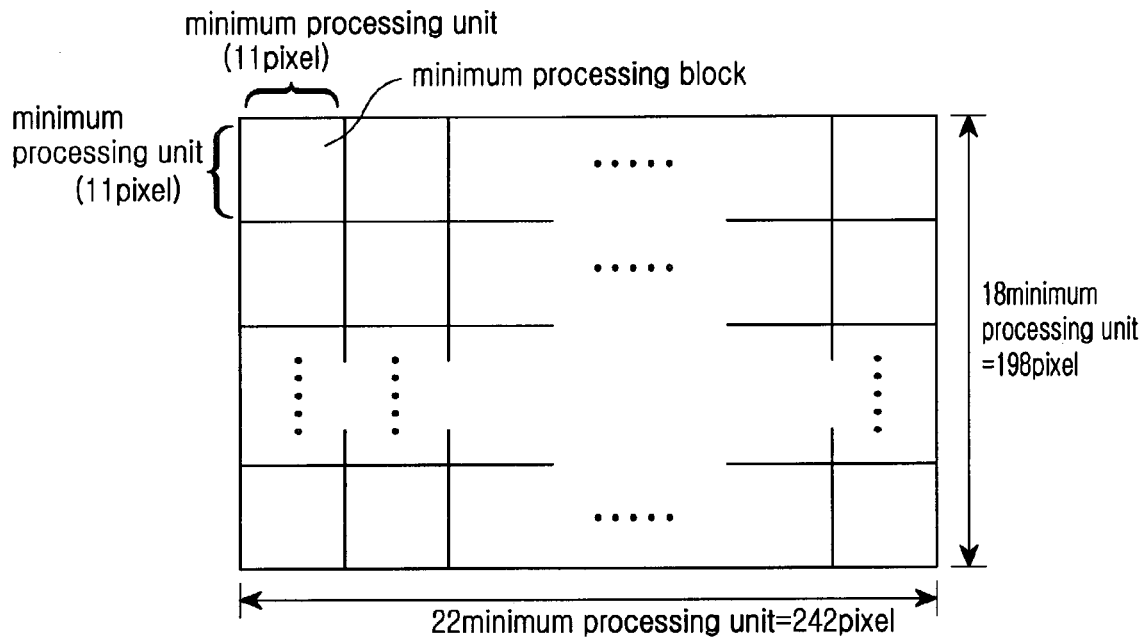
FIGS. 2(a) and 2(b) are exemplary views of a source image and a target image that are divided by a minimum processing unit and a minimum processing block according to the present invention.
Figure 2B:
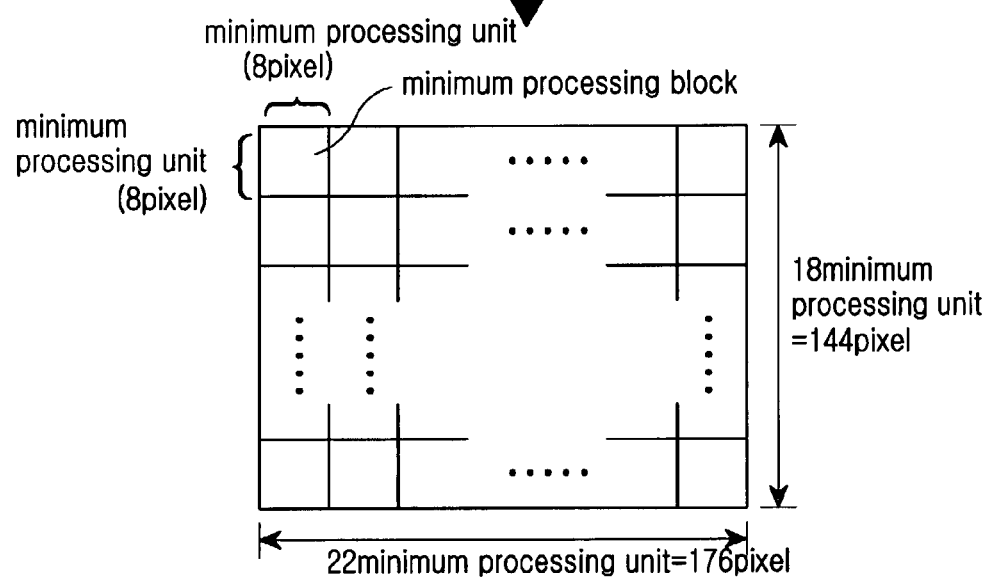

FIG. 2 illustrates an example of a down-scaling, i.e., reducing an image of a size of 242×198, as shown in FIG. 2(a), into an image of a size of 176×144, as shown in FIG. 2(b). Because the greatest common divisor of 242 and 176 is 22, the lateral sides of the source image of FIG. 2(a) and the target image of FIG. 2(b) are divided into 22 minimum processing units. As the greatest common divisor of 198 and 144 is 18, the longitudinal sides of the source image of FIG. 2(a) and the target image of FIG. 2(b) are divided into 18 minimum processing units. The minimum processing unit of the source image includes 11 pixels, and the minimum processing unit of the target image includes 8 pixels. The size of a minimum processing block of the source image is 11×11, and the size of a minimum processing block of the target image is 8×8. Therefore, the source image and the target image are divided into the same number of the minimum processing blocks, i.e., 22×18, even though the size of each minimum processing block of the two images is different from each other. The smaller size of the minimum processing block, the better, and the size may vary depending on the scaling ratio. In the best case, it would be 2×2, and in the worst case, it would have the same size as that of the target image. In the best case, the scaling ratio is 2 or 0.5 times, and the worst case means that a greatest common divisor of the sizes of the source image and the target image cannot be found.

In the present invention, a weight value is defined by an integer that corresponds to the points into which two adjacent pixels of the source image are uniformly divided and is a value belonging to the range of 0~$2^n$, and the sum of the weight values of two pixels is $2^n$. Here, n is a natural number, and will be the same in the description as follows. The weight value is the value to be multiplied by the source image pixel value, corresponding to the difference between the source image pixel and the target image pixel as reflected in the pixel values of the target image produced from the source image. If uniformly dividing the interval of two adjacent pixels into a greater number of points, the weight values can be subdivided into greater values, the processing according to the image scaling can be performed more precisely, and the image quality of the target image can be improved, but the amount of processing is increased. Also, with a higher n value, the weight values can be subdivided into greater values, the processing according to the image scaling can be performed more precisely, and the image quality of the target image can be improved, but the amount of processing is increased. Therefore, the n value can be determined according to the precision of the image that is required in an embedded system employing an image scaling technology of the present invention, i.e., the image quality required for a target image. In experimental results by the inventors of the present invention, 10 is suitable for the n in an IMT-2000 terminal, a PDA and the like, and 8 is suitable for the n in a PC (personal computer).

FIG. 3 illustrates an example in which the interval between two pixels, Pa and Pb is divided by 8, 10 is selected for the n, and a weight value corresponds to the difference with a pixel Pa as a standard pixel of two pixels Pa and Pb. Here, as $2^{10}=1024$, the weight value of 1/8 point of the pixel Pa is 128(=1024×1/8), the weight value of 2/8 point is 256 (=1024×2/8), etc., and the weight value of 8/8 point is 1024(=1024×8/8). Even if the weight value of 1/8 point of the pixel Pa is 128, the weight value of 8/8 is 896. The rest of the points between two pixels Pa and Pb can be obtained in the same manner as above, and the sum of the weight values between the two pixels Pa and Pb is 1024.

The weight values can be obtained from equation 1 as follows, and the present invention describes the case of dividing the interval between two adjacent pixels by 8 as an example shown in FIG. 3a.

$$Vw[i]=\text{(integer cast)}(\{Rs \times i-\text{(integer cast)}(Rs \times i)\} << n) \quad \text{[equation 1]}$$

In equation 1, i is a weight value index, and i is 1~8 in the above case in which the interval of two adjacent pixels is 8 divisions. Vw[i] is the storage alignment of the weight values. Rs is a ratio of source image size/target image size. <<n indicates an n-bit shift toward the highest bit, and the n-bit shift is obtained by multiplying $\{Rs \times i-\text{(integer cast)}(Rs \times i)\}$ by $2^n$.

For example, when selecting n as 10, the sum of the weight values between two adjacent source pixels is $2^{10}=1024$. The weight value is selected as an integer, which belongs to 0~1024 so that the target image pixel corresponds to the difference of the source image pixel as a processing standard for the production of the target image pixel.

Figure 3A:
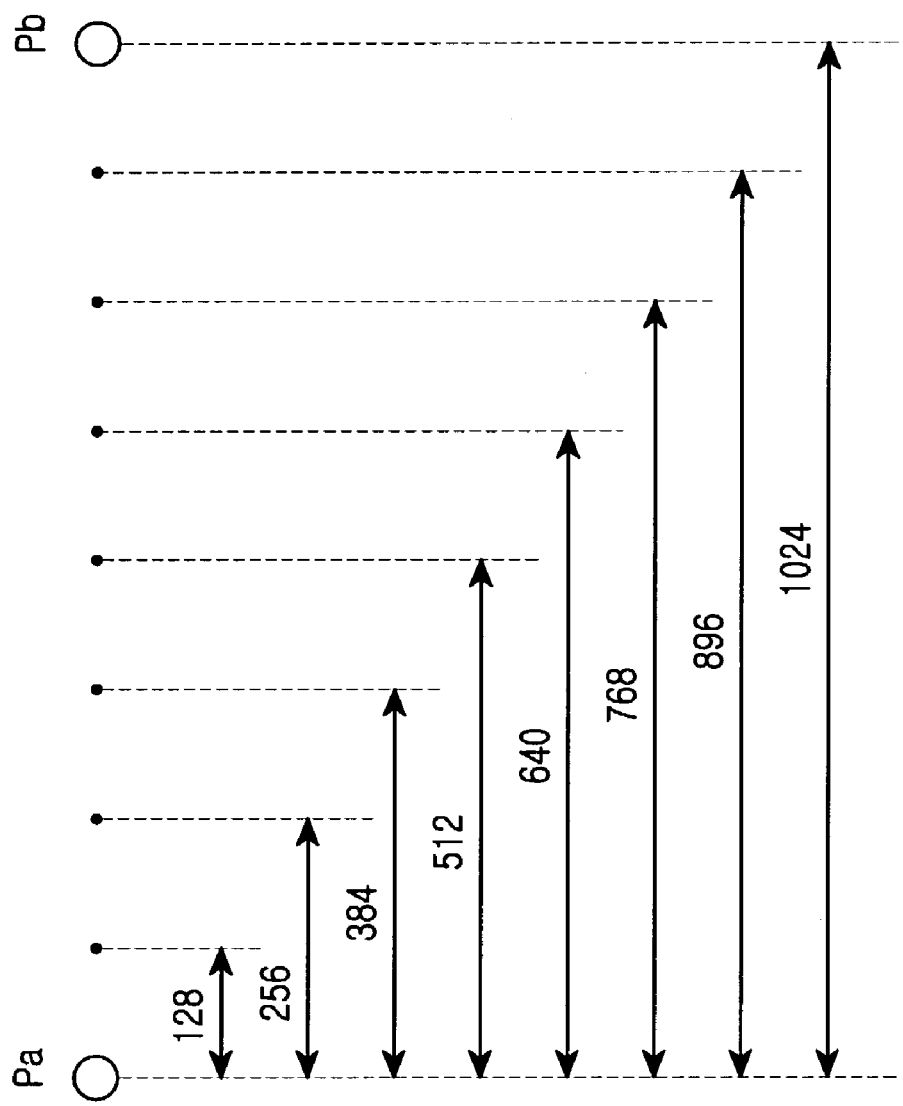
FIG. 3a is an exemplary view of weight values in the case of dividing the interval between two adjacent pixels by 8, according to the present invention.
Figure 3B:
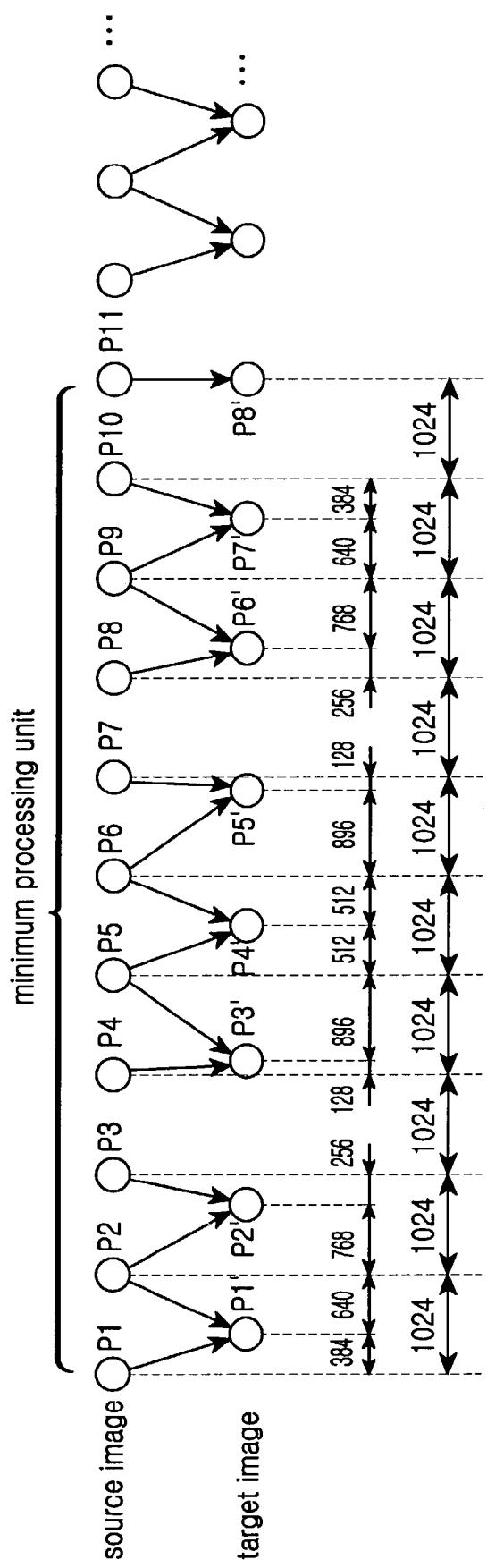
FIG. 3b is an exemplary view illustrating the production of pixel values of a target image from a source image, according to the present invention.

FIG. 3b illustrates when the size of the minimum processing unit of the source image is 11, and the size of the minimum processing unit of the target image is 8, thereby producing 8 target pixels of the target image, P1'~P8' from 11 source pixels of the source image, P1~P11. In this case, the target pixels P1'~P7' are produced by reflecting the pixel values of the two source pixels in accordance with the difference of a corresponding target pixel, the pixel values of the two source pixels being reflected on the pixel values of the adjacent pixels of the corresponding target pixel, and P8' is produced by moving the source pixel, P11 directly. Unlike the above case, the target pixels P1'~P8' can be also produced in such a manner of producing the target pixel, P1' by moving the source pixel, P1 directly, and producing target pixels, P2'~P8' by reflecting the pixel values of the two source pixels in accordance with the difference of a corresponding target pixel, the pixel values of the two source pixels being reflected on the pixel values of adjacent pixel values of the corresponding target pixel. The pixel values of the target pixels, P1'~P7' in FIG. 3b can be produced by multiplying each pixel value of two adjacent source pixels by a weight value that represents the value corresponding to the difference between each source pixel and a corresponding target pixel, summing the two above resultant values, and moving by an n-bit shift towards the lowest bit.

If one pixel in digital images includes 8-bit data, the pixel value is one of the values in the range of 0~255. If the pixel value is n-bit shifted toward the highest bit, the result is the same as when multiplying a corresponding pixel value by $2^n$, and in contrast, if the pixel value is n-bit shifted toward the lowest bit, the result is the same as dividing a corresponding pixel value by $2^n$.

As illustrated in FIG. 2, if the size of the minimum processing unit of the source image is 11, and the size of the minimum processing unit of the target image is 8, the weight values according to equation 1 are illustrated in table 2, which are the same as FIGS. 3a and 3b. However, Vw[8] is the case that the pixel Pb is a standard, and in this case, the weight value is 0, not 1024.

TABLE 2

| Vw[1] | Vw[2] | Vw[3] | Vw[4] | Vw[5] | Vw[6] | Vw[7] | Vw[8] |
|---|---|---|---|---|---|---|---|
| 384 | 768 | 128 | 512 | 896 | 256 | 640 | 0 |

Hereinafter, an example as illustrated in FIG. 3b is described. A target pixel, P1' is produced from two source pixels P1 and P2, and the target pixel P1'=(P1×640+P2× 384)>>10. Herein, >>10 indicates a 10 bit shift toward the lowest bit, which is intended to turn back the result of (P1×640+P2×384) to the value available for a pixel by dividing the result of (P1×640+P2×384) by 1024 because the weight value from equation 1 is the value which is 10-bit shifted toward the highest bit, which results in multiplication by 1024. The production of the target pixel P1' can be realized by multiplication of integer weight values, sum, and shift, and the rest of the target pixels, P2'~P7' can be produced in the same manner. The target pixel P8' is produced by moving the source pixel P11 directly.

Therefore, according to the present invention, target pixel values can be produced by using integer weight values that correspond to the difference of a source pixel as reflected on a target pixel value, and the sum of the weight values between the two pixels is $2^n$ so that the image quality, which is required in an embedded system, is much improved. Also, unlike the conventional case, the processing of the present invention includes only the multiplication of integers without division, and the processing of multiplication or division by n can be made just by a bit-shift, can significantly reduce the amount of processing.

Figure 4:
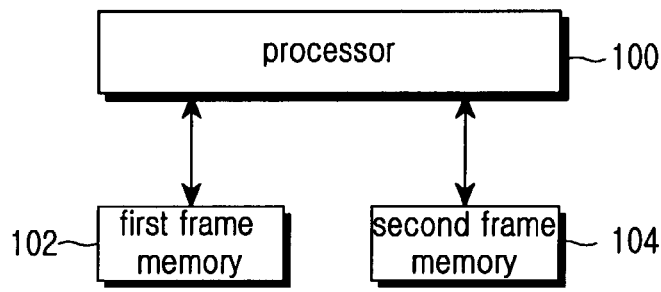
FIG. 4 is a block diagram of an image scaling apparatus according to the present invention.

FIG. 4 is a block diagram of an image scaling apparatus according to an embodiment of the present invention, and the image scaling apparatus includes a processor 100 for processing an image scaling, and first and second frame memories 102 and 104 for storing image data, i.e., pixel data. The processor 100 can use a main processor of an embedded system employing the present invention or can include a separate processor. The first frame memory 102 is used to store the source image data of a first frame and the target image data produced from the source image data, and a second frame memory 104 is used to store the image data necessary during the scaling processing.

Figure 5:
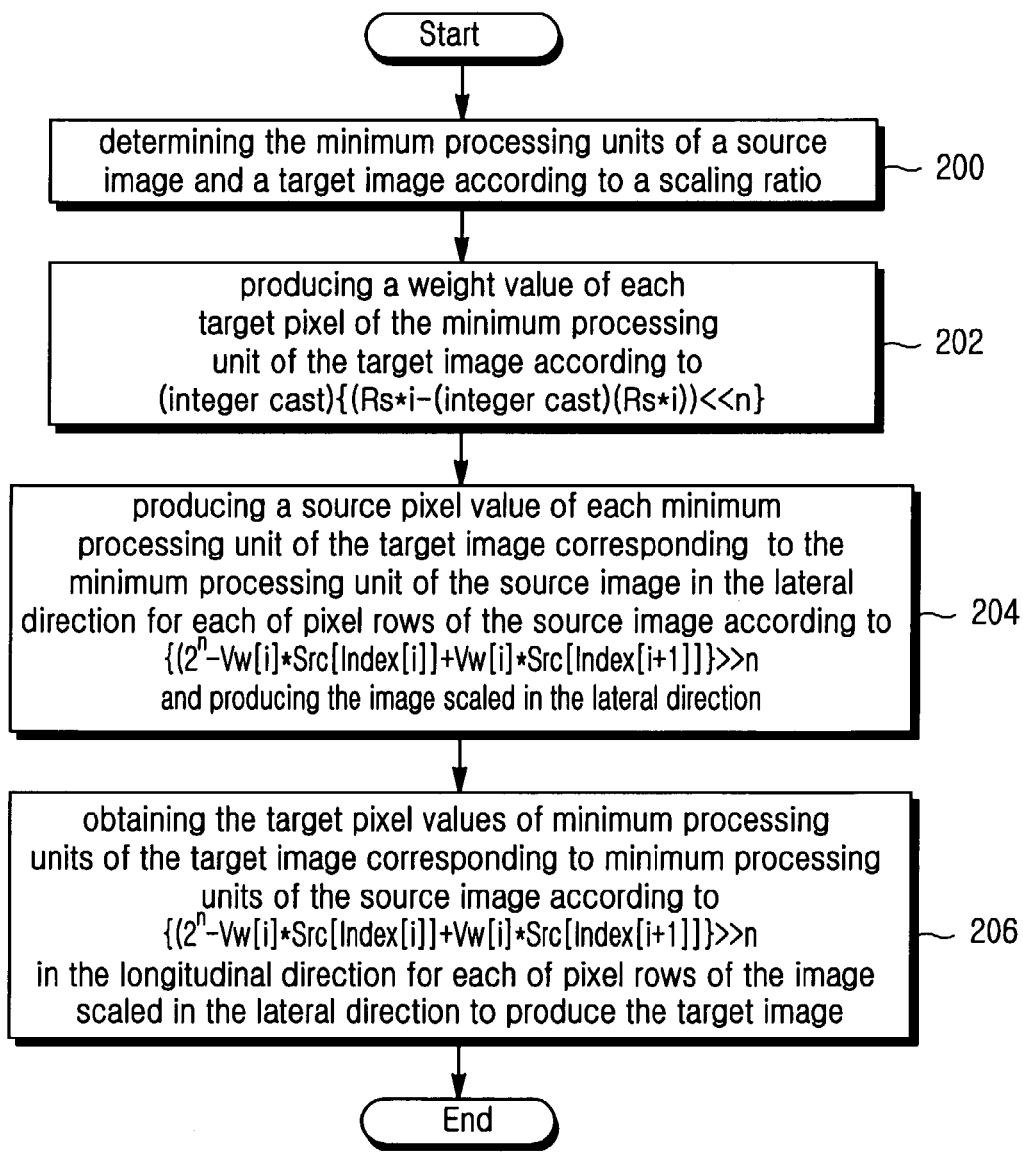
FIG. 5 is a flow chart illustrating an image scaling according to a first embodiment of the present invention.

Referring to FIG. 5, which is a flow chart illustrating the image scaling of the processor 100 according to a first embodiment of the present invention, where the source image data of a first frame is stored in the first frame memory 102. In step 200, the processor 100 determines the size of a minimum processing unit according to a scaling ratio of source image size to target image size. As described above, the number of the minimum processing units of the source image and the target image is determined to be the same as in both the lateral direction and longitudinal direction of both the source image and the target image.

Figure 6:
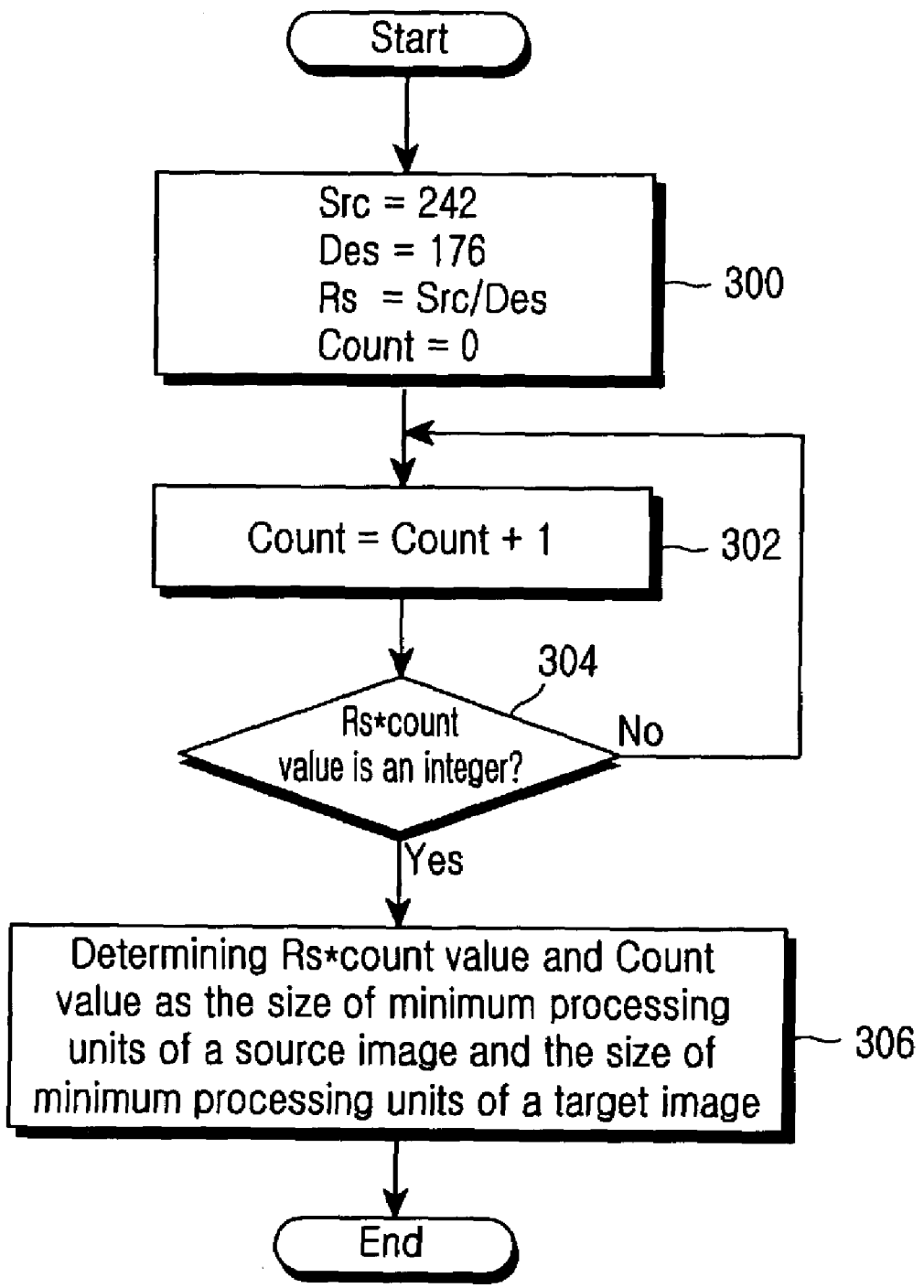
FIG. 6 is a flow chart illustrating the determination of a minimum processing unit according to the present invention.

The process of determining the minimum processing units by the processor 100 can be illustrated in more detail referring to FIG. 6. FIG. 6 illustrates reducing the source image of the size of 242×198 as shown in FIG. 2(a), into the target image of the size of 176×144, as shown in FIG. 2(b), in steps 300~306. First, the processor 100 initializes a source image size Src as 242, a target image size Des as 176, a ratio Rs as Src/Des, and a count value Count as 0 in step of 300. Then, in steps 302~304, the count value Count increases by 1 until Rs multiplied by the Count (Rs×Count) is an integer. Thus, integer times for the ratio Rs are obtained, and the minimum value of an integer Rs×Count is obtained. As the ratio Rs is 242/176=1.375, the minimum value of the integer Rs×Count is 11, and the count value Count is 8. If the minimum value of the integer Rs×Count is obtained is 11, 11 is determined as the size of the minimum processing unit of the source image, and the count value Count is determined as the size of the minimum processing unit of the target image in step 306. Accordingly, the sizes of the minimum processing units of the source image and the target image are determined as illustrated in FIG. 2.

After the processor 100 determines the sizes of the minimum processing units of the source image and the target image in step 200, weight values are obtained according to equation 1 in step 202. Now, the processing of obtaining the weight values by the processor 100 will be described in more detail referring to FIG. 7, which illustrates reducing the source image of the size of 242×198, as shown in FIG. 2(a), into the target image of the size of 176×144, as shown in FIG. 2(b), in steps 400~408.

Figure 7:
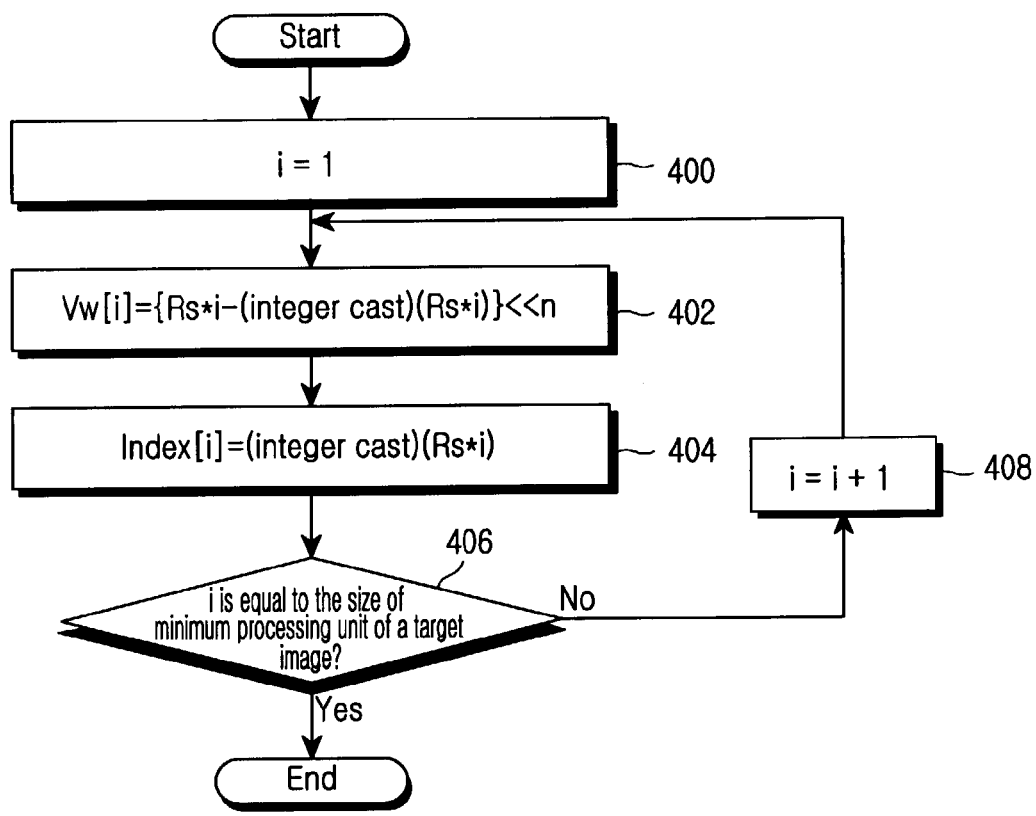
FIG. 7 is a flow chart illustrating the weight value processing according to the present invention.
Figures 9A, 9B, 9C:
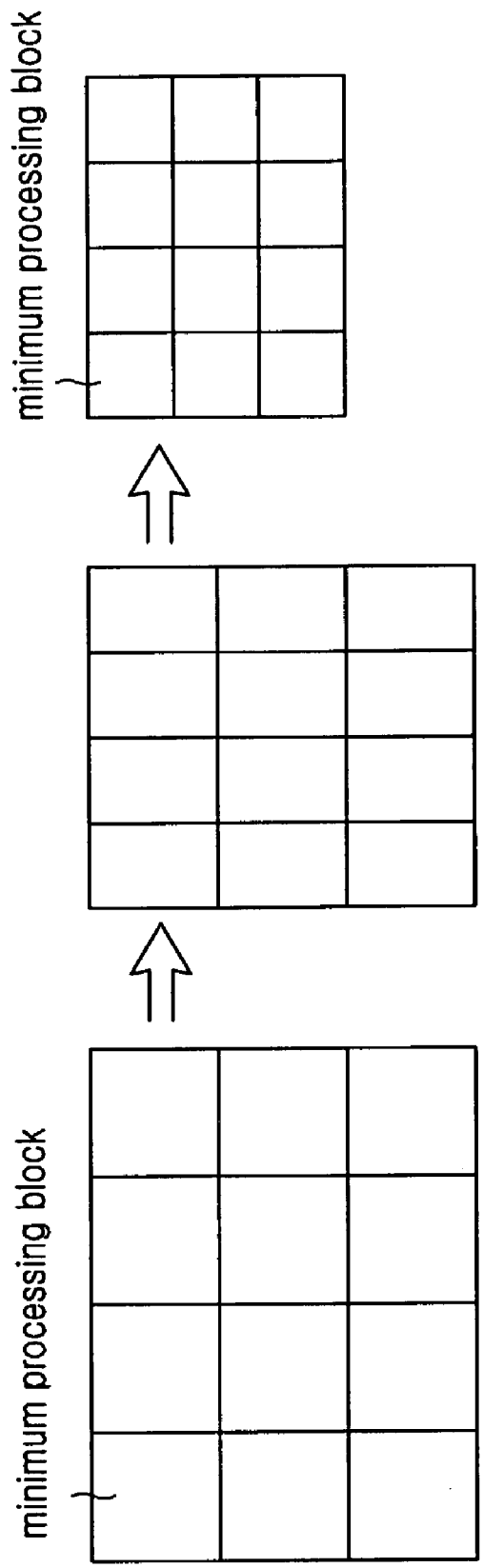
FIG. 9 is an exemplary view illustrating the production of the target image of FIG. 5.

In FIG. 7, the processor 100 initializes an index i as 1 in step 400, and increases the index i by 1 until the index i is equal to the size of the minimum processing unit of the target image, in steps 402~408, to obtain weight values according to equation 1 and to obtain source pixel indices for designating the source pixel to be the processing standard for the production of each target pixel according to the index[i]=(integer cast)(Rs×i) as described below. Here, index[i] is a storage alignment of the source pixel indices. The weight values are obtained as shown in table 2, and the source pixel indices are obtained as shown in table 3. In the meantime, equation shown in step 402 omits selection of an integer for the result of {Rs×i−(integer cast)(Rs×i)}<<n, unlike equation 1, which is based on the result that {Rs×i−(integer cast)(Rs×i)}<<n, is always an integer in case of reducing the source image of the size of 242×198, as shown in FIG. 2(a), into the target image of the size of 176×144, as shown in FIG. 2(b).

direction, as shown in FIG. 9(b), by step of 204 as above to produce the minimum processing units of the target image, and to produce a laterally-scaled image. The image data laterally-scaled is stored in a second frame memory 104.

$$Des[i]=\{(2^n-Vw[i])\times Src[Index[i]]+Vw[i]Src[Index[i+1]]\}<<n \quad \text{[equation 2]}$$

In equation 2, i, Vw[i] are the same as equation 1, and index[i] is (integer cast)(Rs×i) as a storage alignment of the source pixel index. Des[i] is a storage alignment of the minimum processing units of the target image, and Src[Index[i]] is a storage alignment of the minimum processing units of the source image. >>n is an n-bit shift toward the lowest bit, and the n-bit shift provides the same result of dividing $\{(2^n-Vw[i])\times Src[Index[i]]+Vw[i]\times Src[Index[i+1]]\}$ by $2^n$.

Figure 8:
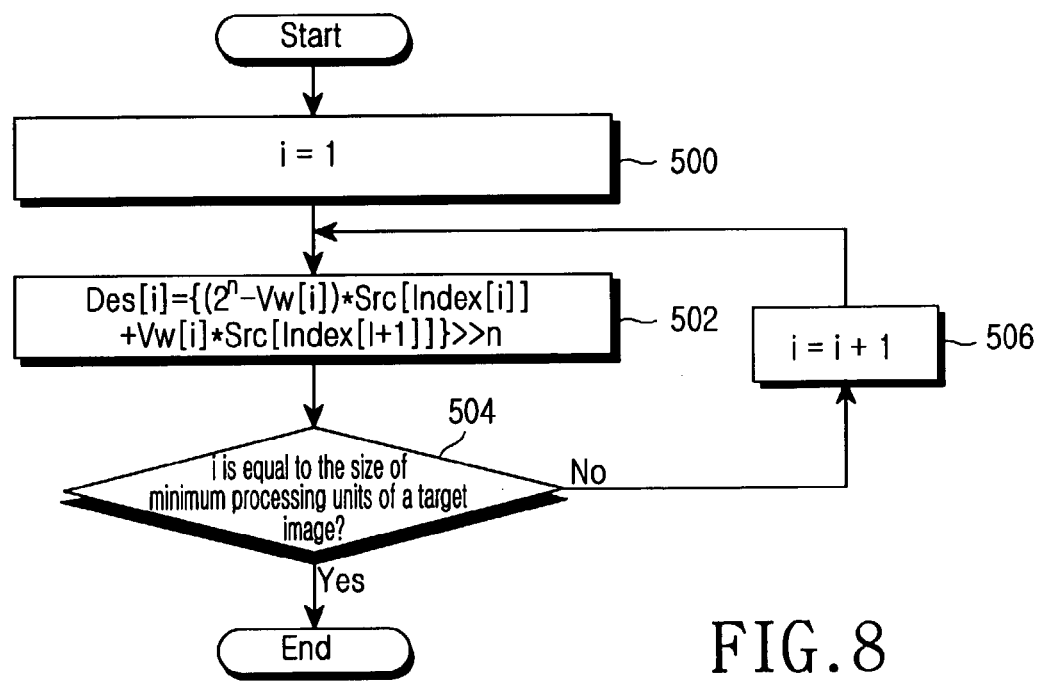
FIG. 8 is a flow chart illustrating the production of minimum processing units of the target image of FIG. 5.

In order to produce a laterally-scaled image described as above, the processing of the processor 100 in producing one minimum processing unit of a target image, which corresponds to one minimum processing unit of a source image, is illustrated in more detail referring to FIG. 8.

FIG. 8 illustrates reducing the source image of the size of 242×198 size, as shown in FIG. 2(a), into the target image of the size of 176×144, as shown in FIG. 2(b), by steps 500~506. First, after the processor 100 initializes index i as 1, it increases the index i by 1 until the index i is equal to the size of the minimum processing unit of a target image, and obtains the target pixel values of the minimum processing unit of the target image according to equation 2. Accordingly, 8 target pixel values of the minimum processing unit of the target image are illustrated in table 4.

TABLE 4

| Des[1] | (640x Src[1] + 384x Src[2]) >> 10 |
| Des[2] | (256x Src[2] + 768x Src[3]) >> 10 |
| Des[3] | (896x Src[4] + 128x Src[5]) >> 10 |
| Des[4] | (512x Src[5] + 512x Src[6]) >> 10 |
| Des[5] | (128x Src[6] + 896x Src[7]) >> 10 |
| Des[6] | (768x Src[8] + 256x Src[9]) >> 10 |
| Des[7] | (384x Src[9] + 640x Src[10]) >> 10 |
| Des[8] | (1024x Src[11] + 640x Src[12]) >> 10 |

Here, Src[1] Src[11] indicate the pixel values of each of the pixels P1~P11 of one minimum processing unit of the source image as shown in FIG. 3B. For example, in the example as described before in reference to FIG. 3b, if describing the case of producing the target pixel P1' from two source pixels P1, P2 in reference to table 3, the pixel value of the target pixel P1', Des[1]=(P1×640+P2×384) >>10. Here, >>10 indicates a 10-bit shift toward the highest

TABLE 3

| index[1] | index[2] | index[3] | index[4] | index[5] | Index[6] | index[7] | Index[8] |
|---|---|---|---|---|---|---|---|
| 1 | 2 | 4 | 5 | 6 | 8 | 9 | 11 |

After the processor 100 obtains weight values in step 202 and obtains the target pixel values of each of the minimum processing units of the target image corresponding to the minimum processing units of the source image in the lateral direction for pixel rows of the source image according to following equation 2 in step 204, the processor 100 produces the image scaled in the lateral direction. If the source image is as shown in FIG. 9(a), the minimum processing units of each pixel row of the source image are scaled in the lateral bit, which is intended to turn back the result of (P1×640+P2×384) to the value available for a pixel by dividing the result of (P1×640+P2×384) by 1024 because the weight value from equation 1 is a value which is 10-bit shifted toward the highest bit when obtaining the weight values from equation 1 in step 402 above. The value of target pixel P8', Des[8] is 0 because the minimum processing units of the source image do not have Src[12], and therefore, Des[8] is obtained by multiplying the value of the source pixel P11 by 1024 and by shifting 10-bit toward the lowest bit, which provides the same result of moving the value of the source pixel P11 directly.

By repeating the process of producing one minimum processing unit of a destitution image corresponding to one minimum processing unit of a source image in steps 502~506, one by one sequentially for the all minimum processing units in the lateral direction of each of the pixel rows of the source image, thus produces the laterally-scaled image as shown in FIG. 9(b) from the source image as shown in FIG. 9(a).

After the processor 100 produces the laterally-scaled image in step 204, the processor 100 produces a target image by obtaining the target pixel values of each of the minimum processing units of a source image corresponding to the minimum processing units of the source image in the longitudinal direction for each of the pixel rows of the laterally-scaled image from equation 2. The production of one minimum processing unit of the target corresponding to one minimum processing unit of the source image can be performed by steps 500~506 above, in the same way as step 204. Accordingly, the laterally-scaled image as shown in FIG. 9(b) is scaled in the longitudinal direction as shown in FIG. 9(c) in step 206, so that the image in FIG. 9(c) is the target image which has been down-scaled in both the lateral direction and in the longitudinal direction. The target image data produced as above is stored in the first frame memory 102 in place of the source image data.

Therefore, the above description regards the production of the source pixel indices, index[i] in step 404, but they can be also obtained in step 502. However, the production by step 502 increases processing because processing is necessary every time the minimum processing unit is processed in step 502 in order to obtain source pixel indices, and therefore, step 404 is more convenient. That is, the production of source pixel indices, index[i] in step 404, requires only one processing for one source image without many repetitions of processing every time when processing a minimum processing unit.

When scaling an image as described above, as the second frame memory 104 stores the data of the image scaled in the lateral direction as shown in FIG. 9(b), it requires as much the storage capacity as above. Generally, as the embedded system described above is short of memory capacity, it is preferable to reduce the memory capacity of the second frame memory 104. If producing a target image from a source image by the unit of a minimum processing block in place of producing the target image by scaling the overall source image first in the lateral direction and then, the longitudinal direction, the second frame memory 104 just needs to have the storage capacity of a minimum processing block of a target image. That is, when down-scaling, the processor 100 starts to store the target image by units of minimum processing blocks from the start of the source image. While producing one minimum processing block of the source image, the image data of the pixels are stored in the second frame memory 104, and if the production of the minimum processing block is completed, the image data of the minimum processing block of the produced target image is stored in the first frame memory 102. Regarding the source image data stored in a storage unit for storing the image data of a minimum processing block of a target image in the first frame memory 102, since it is not necessary after the production of the target image is completed, the image data of a minimum processing block of the target image can be stored instead the above source image data. However, in the case of up-scaling for enlarging a source image, the above method cannot be used because the size of the minimum processing block of a target image is greater than that of the minimum processing block of the source image, and therefore, if using the above method, the data of the source image disappears before the target image is produced. In the consideration of this problem, the processor 100 starts to produce the target image from the end of the source image stored in the first frame memory 102, by units of minimum processing blocks. While producing one minimum processing block of a target image, the image data of pixels is stored in the second frame memory 104 and if the production of one corresponding minimum processing block is completed, the produced minimum processing block is stored from the end of a storage unit of the first frame memory 102.

For the above processing, the first frame memory needs to have a storage capacity at least as much as the size of the enlarged target image. When one frame of the source image is stored before up-scaling, the first frame memory 102 has as much storage capacity at its end as the difference of the source image size and the target image size. As above, the target image starts to be produced by units of a minimum processing block from the end of the source image, and if the produced minimum processing blocks start to be produced from the empty end of the storage unit of the first frame memory 102, the source image data does not disappear before the target image data is produced.

Figure 10:
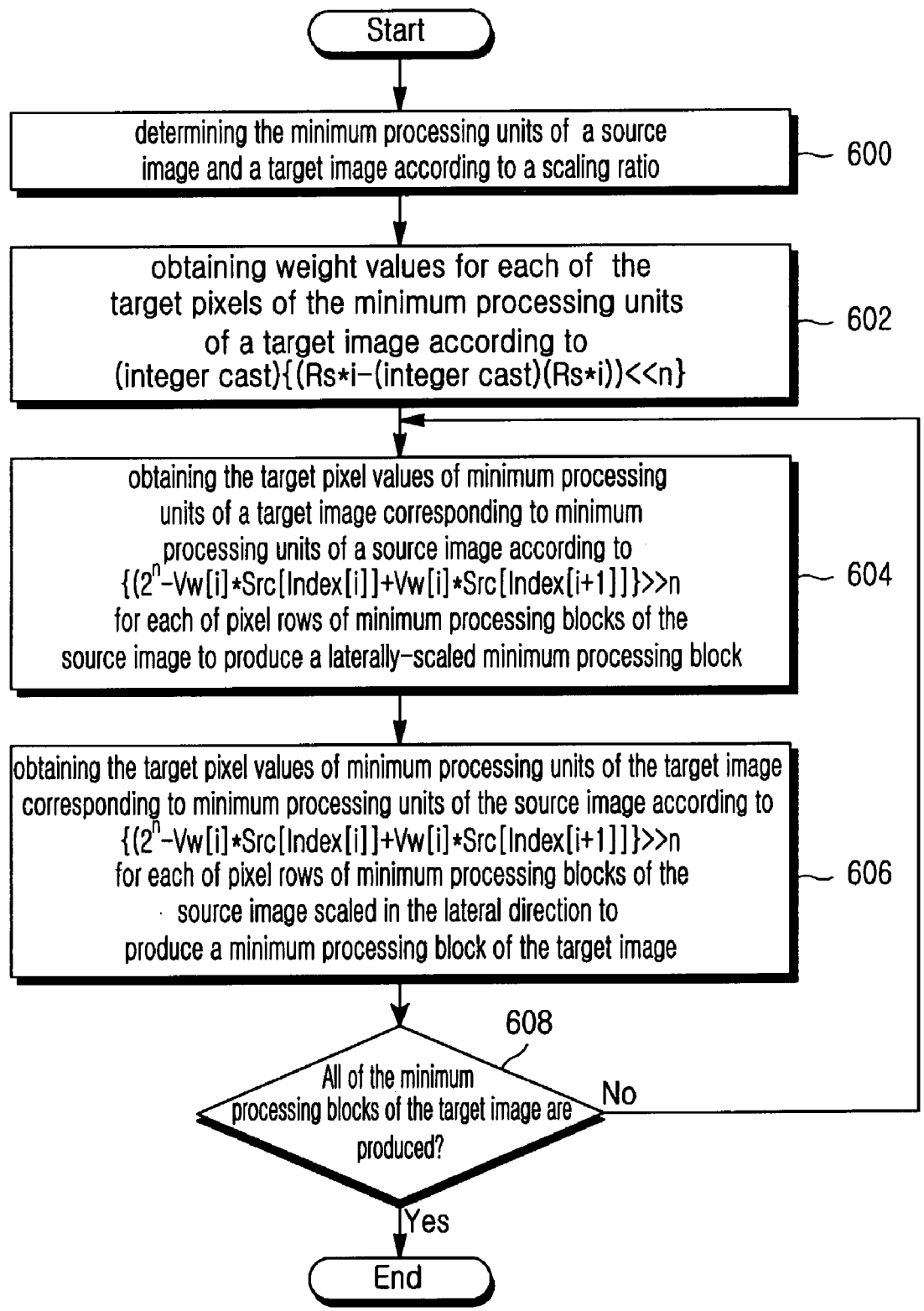
FIG. 10 is a flow chart illustrating an image scaling according to a second embodiment of the present invention.
Figure 12:
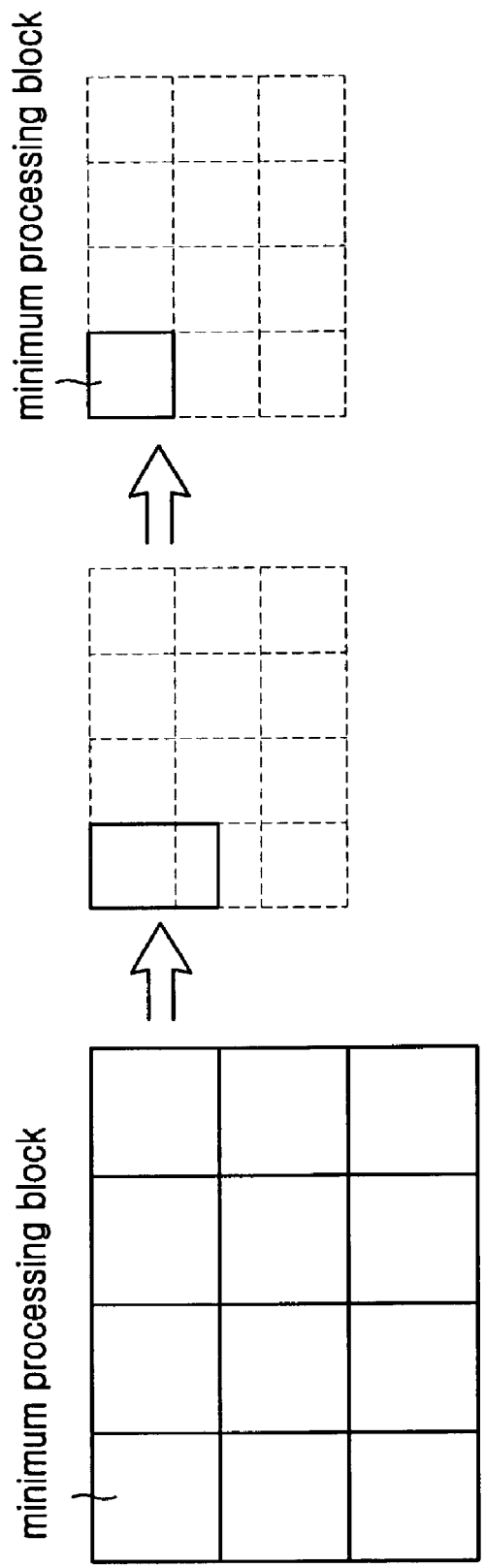
FIG. 12 is an exemplary view illustrating the production of the target image of FIG. 11.

FIG. 10 is a flow chart illustrating an image scaling method according to a second embodiment of the present invention to produce a target image in a minimum processing block unit. The processor 100 determines a minimum processing unit of a source image and a target image according to a scaling ratio in step of 600, and obtains weight values from the equation 1 in step 602. As steps 600 and 602 are the same as steps 200 and 202 in FIG. 5, the description thereof is omitted. Then, the processor 100 obtains target pixel values of each of the minimum processing units of the target image corresponding to the minimum processing unit of the source image for each row of pixels of a minimum processing block of the source image in step 604 from equation 2 to produce a minimum processing block scaled in the lateral direction. The scanned minimum processing block starts to be produced from the start of the source image in the lateral direction. When FIG. 12(a) illustrates the source image, the minimum processing block of the source image is scaled in the lateral direction as shown in FIG. 12(b) in step 604, and the minimum processing block scaled in the lateral direction is produced. The data of the minimum processing block scaled in the lateral direction is stored in the second frame memory 104.

Figure 11:
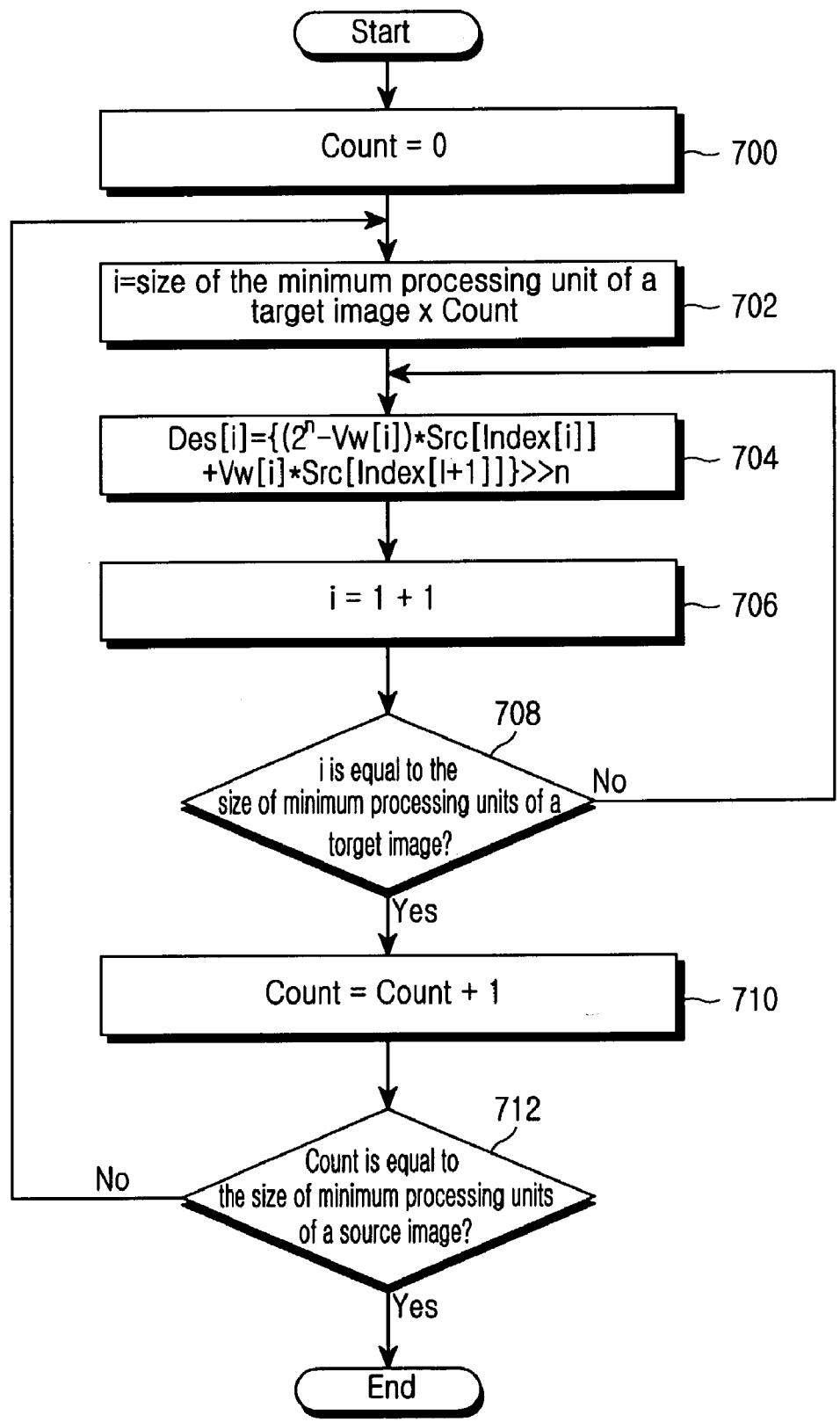
FIG. 11 is a flow chart illustrating the production of minimum processing blocks of the target image of FIG. 10.

FIG. 11 illustrates the processing by the processor 100 for producing one minimum processing block scaled in the lateral direction from one minimum processing block of a source image, by taking an example of reducing an image of the size of 242×198, as shown in FIG. 2(a), into an image of the size of 176×144, as shown in FIG. 2(b), to produce the minimum processing block scaled in the lateral direction in step 604 above. Steps 700~712 regard the production of one minimum processing block scaled in the lateral direction by repeating steps 500~506 of FIG. 8 for producing one minimum processing unit of image data described above as many as the number of minimum processing units of one minimum processing block of the source image. Since the number of the minimum processing units of one minimum processing block is 11, the same as the number of pixel rows, one minimum processing block scaled in the lateral direction is produced in steps 700~712 of FIG. 11.

In FIG. 11, the processor 100 initializes a count value Count as 0 in step 700, and selects 'the size of a minimum processing unit of a target image×Count' as index i in step 702. Then, the processor 100 increases the index i by 1 until the index i is equal to the size of the minimum processing unit of the target image in steps 704~708, just like steps 502~506 of FIG. 8, so as to obtain target pixel values for the minimum processing units of the target image according to equation 2. If the index i becomes the same as the size of the minimum processing unit of the target image, that is, if the processing for one minimum processing unit is completed, the processor 100 increases a count value Count by 1 in step 710 and then checks if the count value Count is equal to the size of the minimum processing unit of a source image in step 712. If the count value Count is not yet equal to the size of the minimum processing unit of the source image, the process goes to step 702 to repeat the processing of a next minimum processing unit. If the count value Count is equal to the size of the minimum processing unit of the source image, the scaling processing for the all minimum processing units of one minimum processing block of the source image in the lateral direction is completed.

As described above, if one minimum processing block scaled in the lateral direction is produced, the processor 100 obtains the target pixel values of the minimum processing unit of the target image corresponding to the minimum processing unit of the source image for each of the pixel rows of the minimum processing block scaled in the lateral direction in step 606 in steps 700~712 from equation 2, just like in step 604 to produce a minimum processing block scaled in the lateral direction and the longitudinal direction. If the minimum processing block scaled in the lateral direction is the same as that in FIG. 12(b), the minimum processing block scaled in the lateral direction and the longitudinal direction, i.e., one minimum processing block of the target image is produced as shown in 12(c) in step 606. The data of the minimum processing block scaled in the lateral direction as above is stored in the first frame memory 104 described above. Then, the processor 100 checks if all the minimum processing blocks of the target image are produced in step 608, and if the production is not completed yet, it proceeds to step 604, and produces a next minimum processing block.

Therefore, if the second frame memory 104 is to be able to store image data necessary during the production of one minimum processing block of the target image from one minimum processing block of the source image, i.e., one minimum processing block only scaled in the lateral direction, it needs to have a storage capacity equal to at least one minimum processing block scaled in the lateral direction. Therefore, the required memory capacity is significantly reduced compared with the first embodiment of the present invention.

According to the first and second embodiments of the present invention, the image quality required for an embedded system is satisfied and their processing only includes multiplication of integers, unlike the conventional case, which includes division processing, and the processing for multiplying or dividing by n can be replaced with a bit-shift to significantly reduce the amount of processing. However, the first and second embodiments involve processing two times by equation 2 for every production of the target pixels of a target image, that is, one time in the case of scaling in the lateral direction, and then, one more time in the case of scaling in the longitudinal direction. From the view of the first and the second embodiments of the present invention as described above, the processing for producing the target image from the source image according to a minimum processing unit as shown in FIG. 3b is repeated in the lateral direction and in the longitudinal direction. That is, the processing for producing 8 target pixels, P1'~P8' from 11 source pixels, P1~P11, by equation 2 is repeated, since the pixel value of a digital image is one of the values 0~255 as described above, only the value incorporated with the processing is varied. By the consideration of the above, the processing for multiplying source pixels by weight values when producing each of the target pixels can be omitted by preparing a look-up table in advance, which is made by multiplying weight values by the pixel values which source pixels could have, i.e., for example in the range of 0~255.

Figure 13:
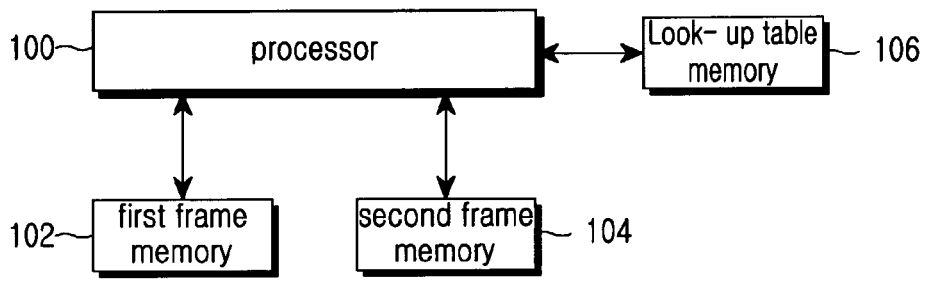
FIG. 13 is a block diagram illustrating an alternate image scaling apparatus according to the present invention.

FIG. 13 illustrates a block diagram of an image scaling apparatus according to another embodiment of the present invention, which is meant to produce a target image using a look-up table as mentioned above, and the image scaling apparatus is constructed by adding a look-up table memory 106 to the image scaling apparatus of FIG. 4, for storing the look-up table therein. The processor 100 produces the look-up table, and stores in the look-up table memory 106 as is described below, before it performs the processing for producing a target image from a source image.

Figure 14:
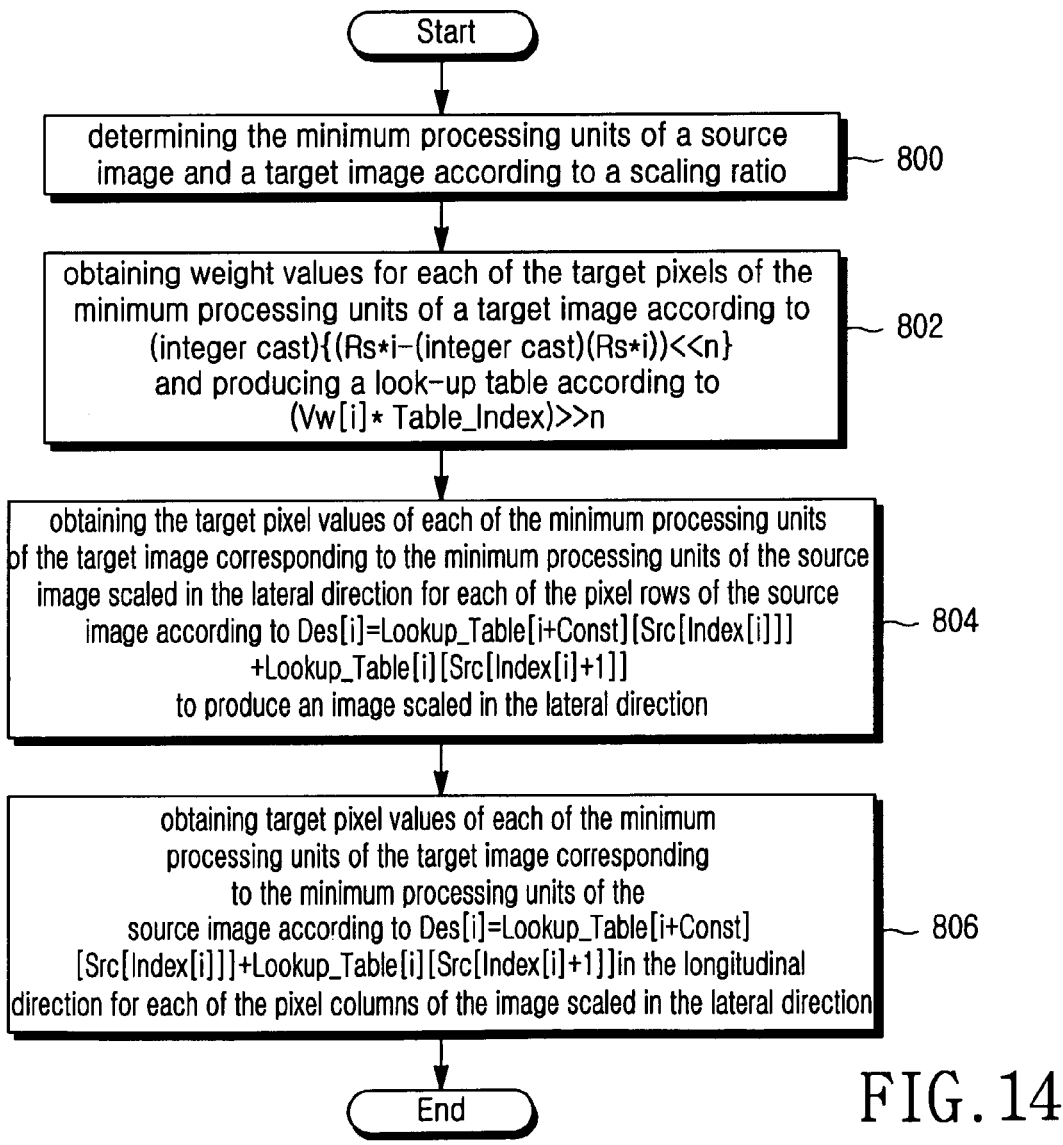
FIG. 14 is a flow chart illustrating an image scaling according to a third embodiment of the present invention.

FIG. 14 is a flow chart of an image scaling process by the processor 100 according to a third embodiment of the present invention, which uses the look-up table. First, the processor 100 determines the minimum processing unit of a source image and a target image according to a scaling ratio in step 800. Step 800 is the same as step 200 in FIG. 5 described above, and the description thereof is omitted. The processor 100 obtains weight values from equation 1 in step 802, and produces a look-up table by multiplying each of the weight values by each of the pixel values, which each pixel can have by equation 3.

$$\text{Lookup\_Table}[i][\text{Table\_Index}] = (Vw[i] \times \text{Table\_Index}) \ll n \qquad \text{[equation 3]}$$

In equation 3, i is an index for target pixels of the minimum processing units of the target image, $Vw[i]$ is a storage alignment of the weight values for the target pixels of the minimum processing unit of the target image, and Lookup_Table[i][Table_Index] is a look-up table storage alignment including the alignments of index i and index Table_Index for the pixel values which each pixel could have.

Figure 15:
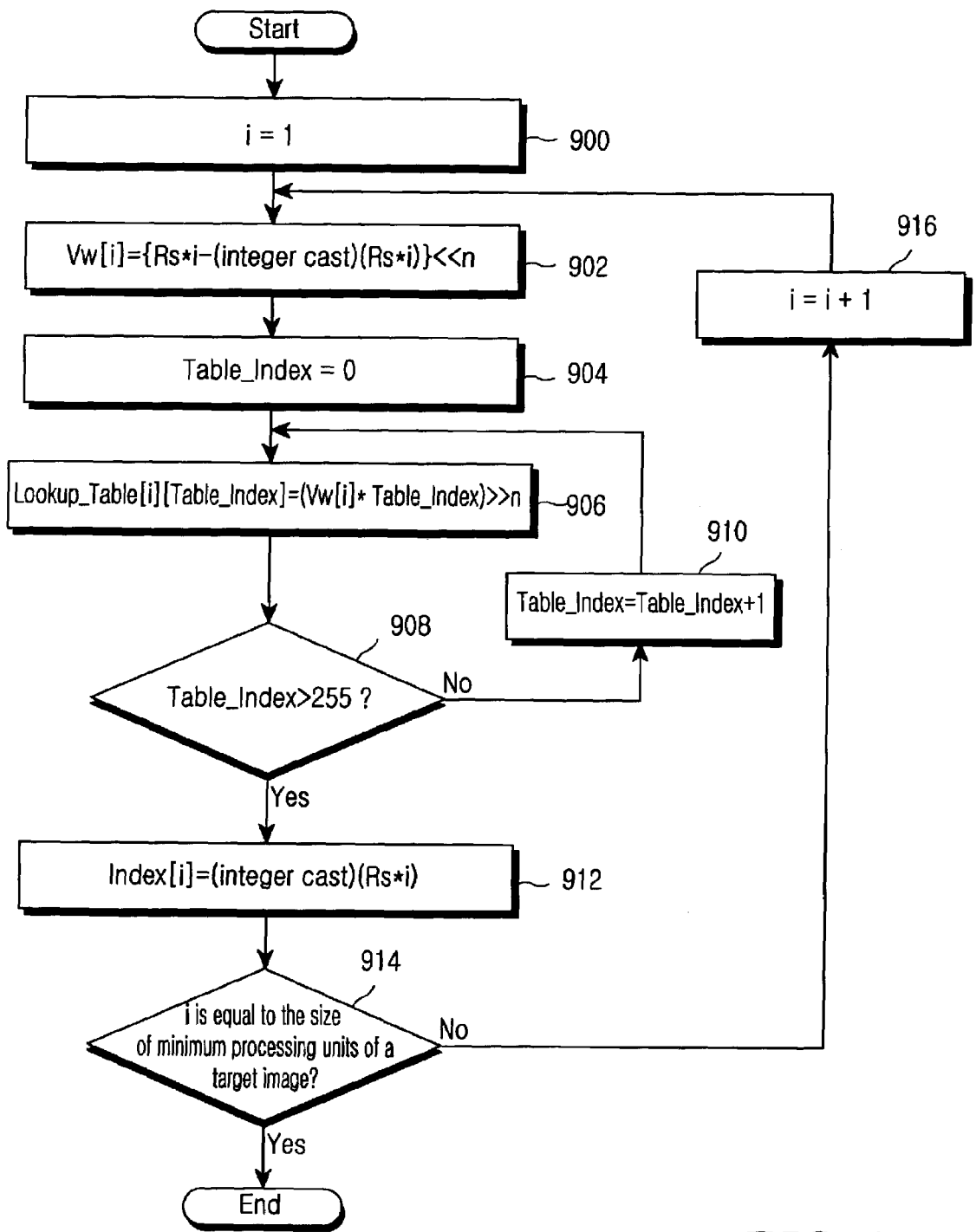
FIG. 15 is a flow chart illustrating the production of a look-up table according to the present invention.

Referring to FIG. 15 which shows in detail a flow chart of processing the look-up table by the processor 100 according to step 802 above, the processor 100 initializes an index i as 1 in step 900, and obtains a weight value from equation 1 in step 902. Then, after it initializes a table index Table_Index as 0 in step 904, it increases the table index Table_Index by 1 until the table index Table_Index exceeds 255 in steps 906~910, and obtains a look-up table for one weight value corresponding to one index value i from equation 3. Finally, if a look-up table including the values 1~255 is obtained for one weight value corresponding to one index value i, a source pixel index the same as step 404 of FIG. 7 is obtained in step 912. Then, by checking if index i is equal to the size of the minimum processing unit of a target image in step 914, when it is not equal to the size of the minimum processing unit of a target image yet, index i is increased by 1 in step 916, and the above processing is repeated from step 902. Until index i is equal to the size of the minimum processing unit of the target image, steps 902~916 are repeated to produce the look-up table Lookup_Table[i]

[Table_Index] of table 5, and produce index alignment Index[i] of table 3, and they are stored in the look-up table memory 106.

TABLE 5

| Lookup Table[1][1] | Vw[1] × 1 >> 10 |
|---|---|
| Lookup Table[1][2] | Vw[1] × 2 >> 10 |
| Lookup Table[1][3] | Vw[1] × 3 >> 10 |
| . | |
| . | |
| . | |
| Lookup Table[1][255] | Vw[1] × 255 >> 10 |
| Lookup Table[2][1] | Vw[2] × 1 >> 10 |
| Lookup Table[2][2] | Vw[2] × 2 >> 10 |
| Lookup Table[2][3] | Vw[2] × 2 >> 10 |
| . | |
| . | |
| . | |
| Lookup Table[2][255] | Vw[2] × 255 >> 10 |
| . | |
| . | |
| . | |
| Lookup Table[8][255] | Vw[8] × 255 >> 10 |

Here, Vw[1]~Vw[8] in table 5 are the same as those in table 3, Vw[1]×1 >>10, Vw[1]×2>>10, Vw[1]×3>>10, . . . , etc. are obtained by producing the multiplied shifted values in the look-up table, and storing them, but are represented just as equations for convenience in the table.

After producing the look-up table and storing in the look-up table memory 106, the processor 100 obtains the target pixel values for each of the minimum processing units of a target image corresponding to the minimum processing units of a source image for each of the pixel rows of the source image in the lateral direction in step 804 from equation 4 by the processing in reference to the look-up table of table 5 so as to produce images scaled in the lateral direction.

$$Des[i]=Lookup\_Table[i+Const][Src[Index[i]]]+Lookup\_Table[i][Src[Index[i]+1]]$$ [equation 4]

Here, in equation 4, i is an index for target pixels of the minimum processing units of the target image, Lookup_Table[i][Table_Index] is a look-up table storage alignment including the alignments of index i and index Table_Index for the pixel values which one pixel could have; Des[i] is a storage alignment of minimum processing units of the target image; Index[i] is a storage alignment of source pixel indices as a processing standard for producing the target pixels and it equals (integer cast)(Rs×i); and Const is initialized as ½ the size of the minimum processing unit of the target image as described below, and if the index i is greater than ½ the size of the minimum processing unit of the target image, its sign is converted.

Figure 16:
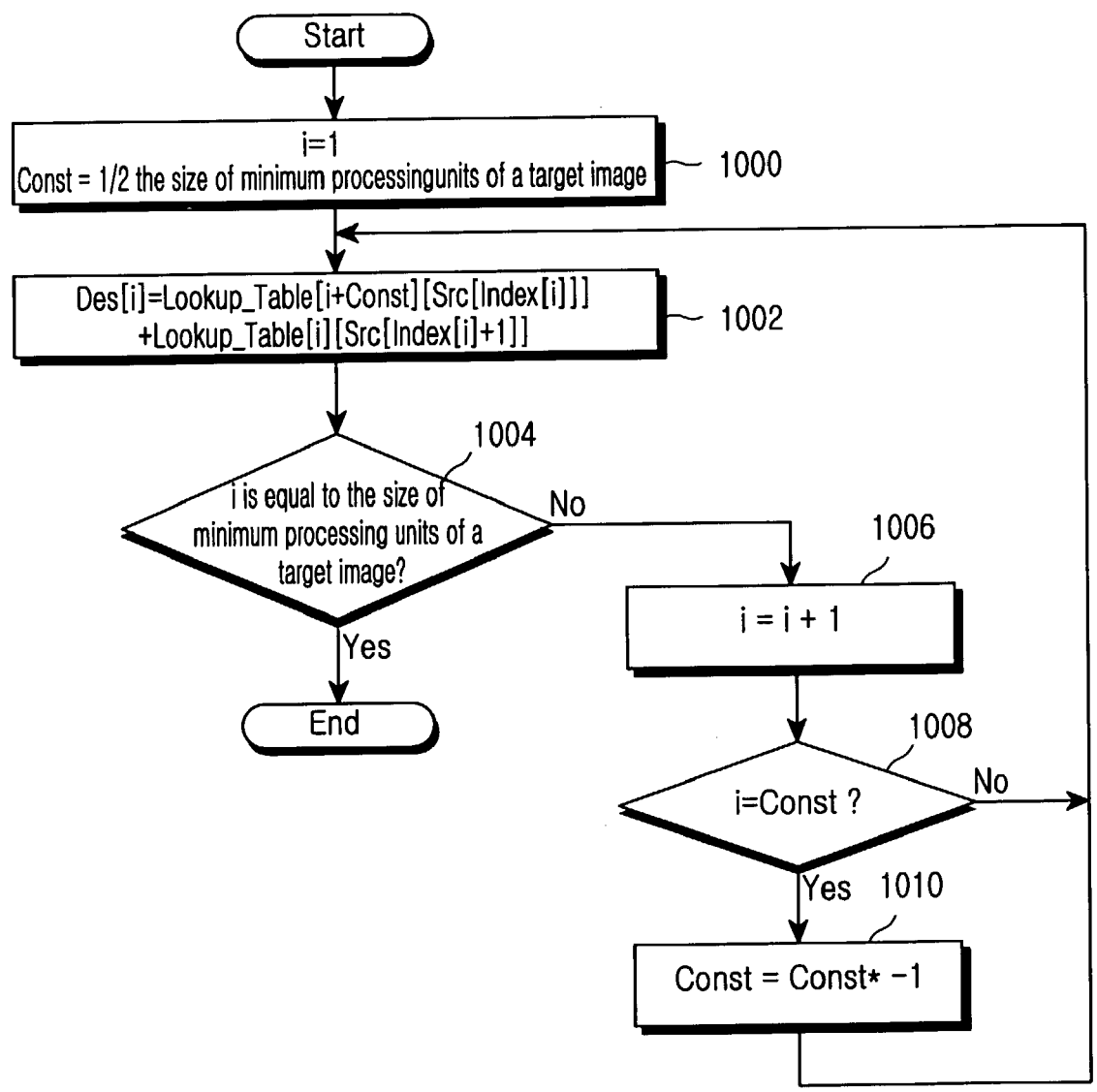
FIG. 16 is a flow chart illustrating the production of minimum processing units of the target image of FIG. 15.

In order to produce a laterally-scaled image described as above by using the look-up table as above, the processing of the processor 100 for producing one minimum processing unit of a target image corresponding to one minimum processing unit of a source image is illustrated in more detail in reference to FIG. 16, which shows an example of reducing the source image of the size of 242×198, as shown in FIG. 2(*a*), into the target image of the size of 176×144, as shown in FIG. 2(*b*), in steps 1000~1010.

In FIG. 16, after the processor 100 initializes index i as 1, and selects Const value as ½ the size of the minimum processing unit of the target image, i.e., 4, it increases the index i by 1 until the index i is equal to the size of the minimum processing unit of the target image, and obtains the target pixel values of the minimum processing unit of the target image according to equation 4. If the index i is greater than ½ the size of the minimum processing unit of the target image, the sign of the Const value is converted in step 1010. Accordingly, 8 target pixel values of the minimum processing unit of the target image are obtained as shown in table 4. However, since the multiplication of source pixel values and weight values and bit-shift are already processed when producing the look-up table as above, each of the target pixel values can be obtained just by summing the value corresponding to Lookup_Table[i+Const][Src[Index[i]] in the look-up table as shown in table 5 and the value of Lookup_Table[i][Src[Index[i]+1]].

By repeating the process of producing one minimum processing unit of a destitution image corresponding to one minimum processing unit of a source image in steps 1000~1010, one by one sequentially for the all minimum processing units in the lateral direction of each of the pixel rows of the source image in step 804, thus the laterally-scaled image is produced the laterally-scaled image as shown in FIG. 9(*b*) from the source image as shown in FIG. 9(*a*).

After the processor 100 produces the laterally-scaled image from the above step 804, it produces a target image in step 806 by obtaining the target pixel values of each of the minimum processing units of a source image corresponding to the minimum processing units of the source image in the longitudinal direction for each of the pixel rows of the laterally-scaled image from equation 4 and by the processing in reference to the look-up table of table 5. The production of one minimum processing unit of the target image corresponding to one minimum processing unit of the source image is performed in steps 1000~1010, just as in step 804. Accordingly, the laterally-scaled image as shown in FIG. 9(*b*) is scaled in the longitudinal direction as shown in FIG. 9(*c*) in step 806, so that the image in FIG. 9(*c*) is the target image which is down-scaled in the lateral direction and in the longitudinal direction. The data of the target image produced as above is stored on the first frame memory 102 in place of the data of the source image.

Therefore, the processor 100 can reduce the amount of processing and its processing speed for scaling can be increased, because when producing each target pixel, the look-up table is used, which is produced in advance by multiplying pixel values by weight values so that the multiplication processing can be omitted from equation 2.

The sizes of a source image and a target image are normally fixed in embedded systems, and even if the size change is possible by the selection of users, it cannot change its size every frame. Once the look-up table is made, the preset-up look-up table can be used as long as the power of the embedded system is "on", or before the sizes of the source image and the target image are changed. Even in the worst case, it can be used at least for one frame. If the embedded system employing the present invention is one in which the sizes of the source image and the target image are fixed, i.e., it displays images output from a standard video CODEC according to an image size of LCD, it is not necessary to change the above look-up table, so that the production processing of the look-up table as above can be omitted if manufacturers store the look-up table in nonvolatile memory.

The present invention for scaling images using the look-up table as above can be performed in combination with the second embodiment of the present invention shown in FIG. 10, for producing target images by units of a minimum processing block.

Figure 17:
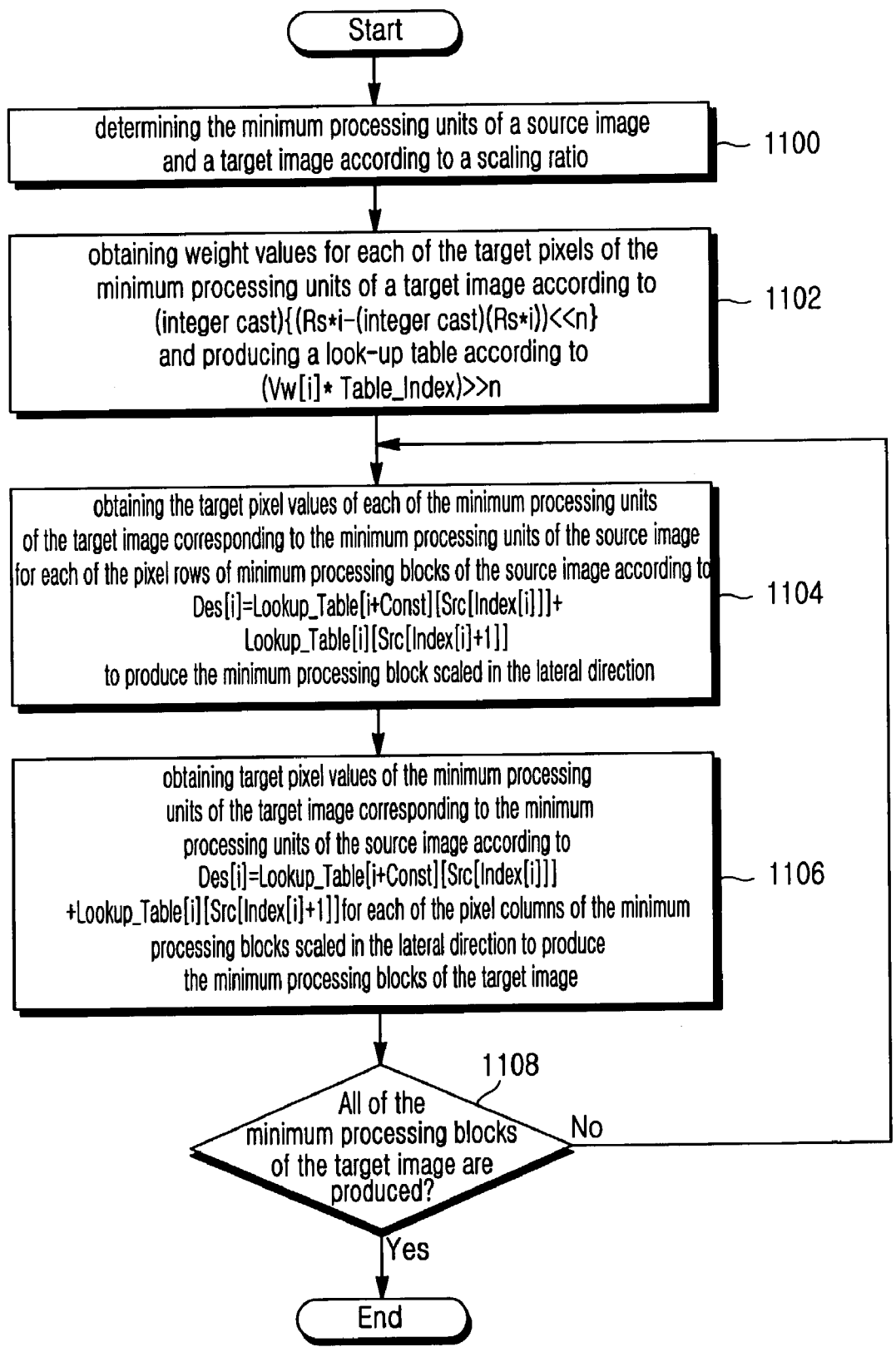
FIG. 17 is a flow chart illustrating an image scaling according to a fourth embodiment of the present invention.

FIG. 17 illustrates the flow chart of image scaling by the processor 100 according to the fourth embodiment of the present invention. In FIG. 17, the processor 100 determines the minimum processing units of a source image and a target image according to a scaling ratio in step 1100, and produces a look-up table as in table 5 from equation 3 after obtaining weight values from equation 1 in step of 1102. As steps 1100 and 1102 are the same as steps 800 and 802, the description thereof is omitted. Then, the processor 100 obtains the target pixel values for each of the minimum processing units of a target image corresponding to the minimum processing units of a source image for each of the pixel rows of the minimum processing block of the source image in step 1104 from equation 4 by the processing in reference to the look-up table as in table 5 so as to produce the minimum processing blocks scaled in the lateral direction. The processor 100 starts to produce the minimum processing blocks scaled in the lateral direction from the start of the source image. If the source image is the same as that in FIG. 12(a), the minimum processing block of the source image is scaled in the lateral direction as shown in FIG. 12(b) in step 1104 so as to produce the laterally-scaled minimum processing block. The data of the laterally-scaled minimum processing block produced as above is stored in the second frame memory 104.

Figure 18:
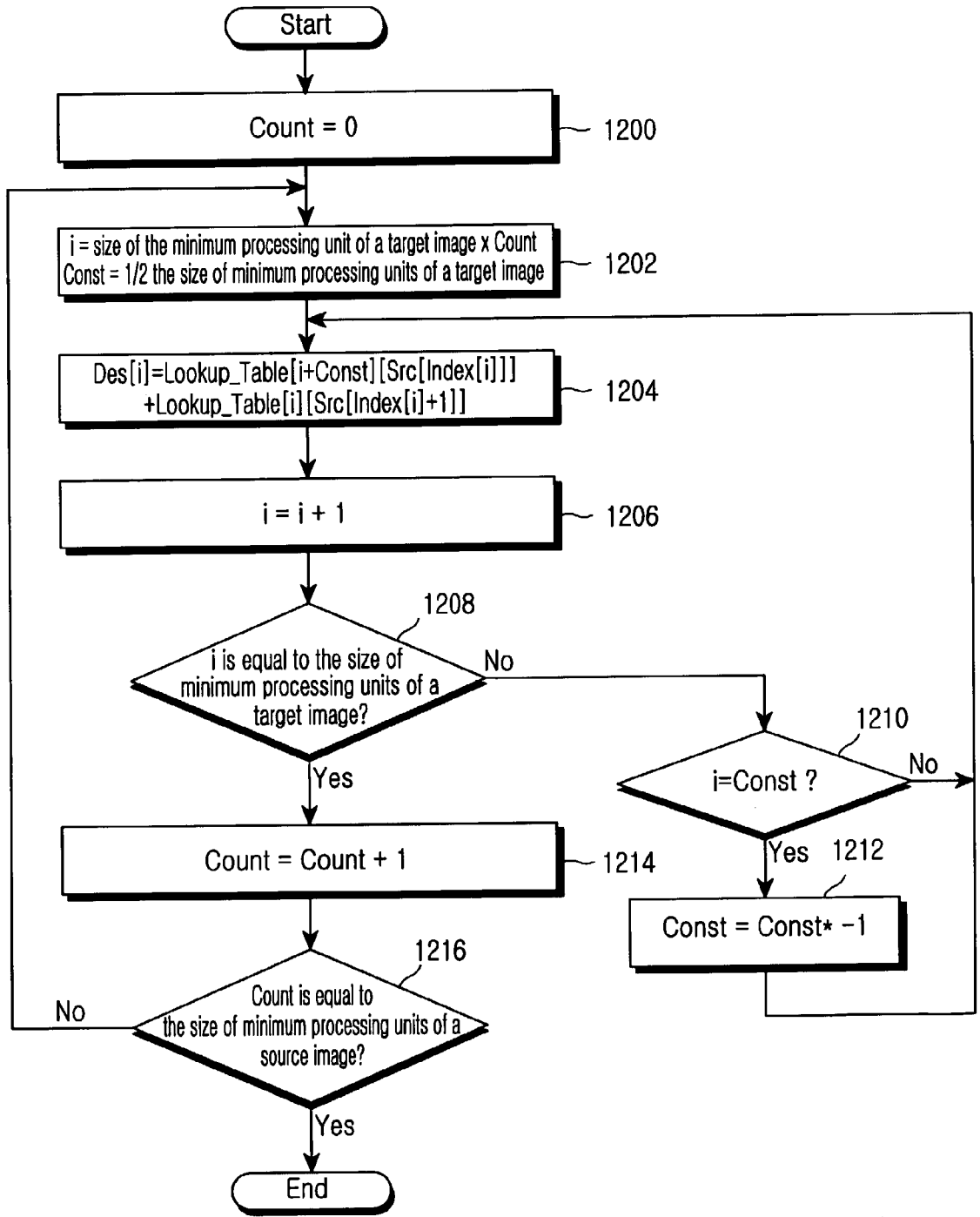
FIG. 18 is a flow chart illustrating the production of minimum processing blocks of the target image of FIG. 17.

FIG. 18 illustrates the processing by the processor 100 for producing one minimum processing block scaled in the lateral direction from one minimum processing block of a source image corresponding thereto in steps 1200~1216, by taking an example of reducing an image of the size of 242×198, as shown in FIG. 2(a), into an image of the size of 176×144, as shown in FIG. 2(b), to produce the minimum processing block scaled in the lateral direction in step 804 above.

Steps 1200~1216 illustrate the process of producing one minimum processing block scaled in the lateral direction by repeating steps 1000~1010 for producing image data of one minimum processing unit by referring to the look-up table, that is as many as the number of the minimum processing units of one minimum processing block of a source image.

Since the number of the minimum processing units of one minimum processing block is 11, the same as the number of pixel rows, one minimum processing block scaled in the lateral direction is produced in steps 1200~1216 of FIG. 18, and the Const value is selected as ½ the size of the minimum processing unit of the target image, i.e., 4.

In FIG. 18, the processor 100 initializes a count value Count as 0 in step 1200, and selects 'the size of a minimum processing unit of a target image×Count' as index i in step 1202. Then, the processor 100 increases the index i by 1 until the index i is equal to the size of the minimum processing unit of the target image in steps 1204~1212 just like the steps 1002~1010 of FIG. 16 so as to obtain target pixel values of the minimum processing units of the target image according to equation 4 by the processing in reference to the look-up table of table 5. If the index i becomes the same as the size of the minimum processing unit of the target image, that is, if the processing for one minimum processing unit is completed, the processor 100 increases a count value Count by 1 in step 1214 and then, checks if the count value Count is equal to the size of the minimum processing unit of a source image in step 1216. If the count value Count is not equal to the size of the minimum processing unit of the source image yet, the process goes to step 1202 to repeat the processing of a next minimum processing unit. If the count value Count is equal to the size of the minimum processing unit of the source image, the scaling processing for the all minimum processing units of one minimum processing block of the source image in the lateral direction is completed.

After the processor 100 produces the laterally-scaled image, it produces a minimum processing block scaled in the lateral direction and in the longitudinal direction in step 1106 by obtaining target pixel values of the minimum processing unit of the target image corresponding to the minimum processing unit of the source image for each of the pixel rows of the minimum processing blocks scaled in the lateral direction by the processing in reference to the look-up table of the table from equation 4 in steps 1200~1216 just like step 1104. If the laterally-scaled minimum processing block is the same as that in FIG. 12(b), a minimum processing block, which is scaled in the lateral direction and in the longitudinal direction as shown in FIG. 12(c), i.e., one minimum processing block of the target image is produced in step 1106. The data of the laterally-scaled minimum processing block is stored in the first frame memory 104. Then, the processor 100 checks if all the minimum processing blocks of the target image are produced in step 1108, and if the production is not completed yet, it proceeds to step 1104, and produces a next minimum processing block. If the production of the all minimum processing blocks of the target image is completed, the process of the flow chart ends.

Therefore, using the look-up table can reduce the burden of the processor 100, and the processing speed for scaling is increased. In addition, the storage capacity of the second frame memory 104 can be reduced to a size equal to one minimum processing block scaled in the lateral direction.

Additionally, in the case of down-scaling a 242×198 size image, as shown in FIG. 2(a), into a 176×144 size image, as shown in FIG. 2(b), an example of program for reducing images in the lateral direction using a look-up table by using ANSI (American National Standards Institute)-C language is described as follows. Unlike FIG. 3b, the following program is one example produced by using a source pixel value P1 for a target pixel value P1', and reflecting the pixel values of two adjacent source pixels on the pixel values of rest of the target pixels P2'~P8'.

```
for (i=0; i<198; i++)
  for (j=0; j<22; j++)
  {
    scr Index=i*242 + j*11);
    des Index=i*176 + j*8);
      des [des Index]=src[src Index];
      des [des Index + 1]=tb375src[src Index + 2] + tb625[src[src Index + 1]];
      des [des Index + 2]=tb750src[src Index + 3] + tb250[src[src Index + 2]];
      des [des Index + 3]=tb125src[src Index + 5] + tb875[src[src Index + 4]];
      des [des Index + 4]=(src[src Index + 5] + src[src Index + 6]) >> 1;
```

-continued

```
des [des Index + 5]=tb125src[src Index + 6] + tb875[src[src Index + 7]];
des [des Index + 6]=tb750src[src Index + 8] + tb250[src[src Index + 9]];
des [des Index + 7]=tb375src[src Index + 9] + tb625[src[src Index + 10]];
}
```

That is, by processing pixel rows for an overall image, 176 pixels of 242 pixels are produced, and by repeatedly processing the minimum processing blocks 22 times, the processing is completed. As above, as the pixel values as a result of processing are the pixel values of laterally adjacent pixels in the case of the above processing in the lateral direction, the efficiency can be increased if storing 4 pixel values in 32 bit by a shift and OR.

As described above, the program for reducing the laterally-scaled image in the longitudinal direction by using a look-up table will be described as follows using ANSI-C language.

[srcIndex+6], and shifting toward the lowest bit by 1 bit, and des[desIndex+4*176] is produced by summing two source pixel values, src[srcIndex+5*176] and src[srcIndex+6*176], and shifting toward the lowest bit by 1 bit as shown in the above program, so that there is no necessity for an additional look-up table.

By the experiment results by the inventors of the present invention, the present invention provides adaptability without image quality reduction in a 50~200% scaling ratio by the standard of CIF, in the case of the size of 8×8 of a minimum processing block. Additionally, reduction by 8 steps and enlargement by 4 steps are possible in the case of

```
for (i=0; i<18; i++)
  for (j=0; j<176; j++)
  {
scr Index=i*11*176+j;
des Index=i*8*176+j;
des [des Index]=src[src Index];
des [des Index + 1*176]=tb375src[src Index + 2*176] + tb625[src[src Index + 1*176]];
des [des Index + 2*176]=tb750src[src Index + 3*176] + tb250[src[src Index + 2*176]];
des [des Index + 3*176]=tb125src[src Index + 5*176] + tb875[src[src Index + 4*176]];
des [des Index + 4*176]=(src[src Index + 5*176] + src[src Index + 6*176]) >> 1;
des [des Index + 5*176]=tb125src[src Index + 6*176] + tb875[src[src Index + 7*176]];
des [des Index + 6*176]=tb750src[src Index + 8*176] + tb250[src[src Index + 9*176]];
des [des Index + 7*176]=tb375src[src Index + 9*176] + tb625[src[src Index + 10*176]];
  }
```

That is, by processing pixel columns for the overall image, 144 pixels of 198 pixels are produced, and by repeatedly processing the minimum processing blocks 18 times, the processing is completed.

As described above, in the reduction program in the lateral direction and the reduction program in the longitudinal direction for the source image, tb125[ ]~tb[ ] mean the look-up table as shown in the following table 6.

TABLE 6 tb125[i] = (unsigned char)(i × 128 >> 10); // 1/8
tb250[i] = (unsigned char)(i × 256 >> 10); // 2/8
tb375[i] = (unsigned char)(i × 384 >> 10); // 3/8
tb625[i] = (unsigned char)(i × 640 >> 10); // 5/8
tb750[i] = (unsigned char)(i × 768 >> 10); // 6/8
tb875[i] = (unsigned char)(i × 896 >> 10); // 7/8

In table 6, tb125[i], tb250[i], tb375[i], tb625[i], tb750[i], tb875[i] indicates a look-up table for weight values of ⅛, ⅖, ⅜, ⅝, ⅞ points from a pixel Pa in FIG. 3a as described above for the pixel values 0~255 provided as unsigned. For example, when a weight value is Vw[1]=384 in table 2, Lookup_Table[1][1], Lookup_Table[1][2], . . . , Lookup_Table[1][255] correspond to tb375[i]. Therefore, the look-up table of table 6 is substantially the same as the look-up table of table 5. However, in table 6, unlike table 5, there is no look-up table, corresponding to 512 weight value, i.e., tb500[i], which is because des[desIndex+4] is produced by summing two source pixel values, src[srcIndex+5] and src processing weight values by dividing two adjacent pixels by 8 points and using a look-up table as shown in tables 5 and 6. Additionally, when processing weight values by dividing two adjacent pixels by 16 points, reduction by 16 steps and enlargement by 8 steps are possible by using a look-up table as shown in table 7 with table 6.

TABLE 7 tb0625[i] = (unsigned char)(i × 64 >> 10; // 1/16
tb1875[i] = (unsigned char)(i × 192 >> 10; // 3/16
tb3125[i] = (unsigned char)(i × 320 >> 10; // 5/16
tb4375[i] = (unsigned char)(i × 448 >> 10; // 7/16
tb5625[i] = (unsigned char)(i × 576 >> 10; // 9/16
tb6875[i] = (unsigned char)(i × 704 >> 10; // 11/16
tb8125[i] = (unsigned char)(i × 832 >> 10; // 13/16
tb9375[i] = (unsigned char)(i × 960 >> 10; // 15/16

If dividing the interval of two adjacent pixels into the more number of points uniformly, because the weight values can be subdivided into the more values, and the processing can be performed more precisely, the image quality of the target image can be improved, but the amount of processing is increased. Therefore, it is preferable to produce a look-up table which is available for enlargement or reduction just with a predetermined number of steps, and another look-up table including the processing associated with approximate values in the case that a corresponding ratio is not exactly fit to the enlargement or the reduction steps as above.

As described above, when realizing a digital image scaling, the present invention provides the effects of minimizing the deterioration of image quality and reducing the amount of processing because target pixel values are obtained by the processing involving multiplication and summation of integers and bit-shift by using integer weight values, in which the sum of the weight values between two pixels is $2^n$, and therefore, the image scaling can be easily realized on an embedded system in various ways.

While the invention has been shown and described with reference to certain preferred embodiments thereof, it will be understood by those skilled in the art that various changes and modifications can be possible without departing from the spirit and scope of the invention. Particularly, in the specific embodiment of the present invention, an example of down-scaling a 242×198 size image into a 176×144 size image is made, but the present invention can be employed in the same way even if the sizes of a source image and a target image are changed. In addition, the present invention can be employed in other systems where a digital image scaling is required as well as in the embedded system. Therefore, the spirit and scope of present invention is not limited in the embodiments described above, and it should be defined by the appended claims and their equivalents.

What is claimed is:

1. An image scaling method for producing a digital target image by scaling a digital source image in an embedded system, the method comprising the steps of:
   a) determining respective sizes of minimum processing units of a source image and a target image so that the source image and the target image are divided into a same number of minimum processing units in respective lateral and longitudinal directions according to a scaling ratio of the source image size to the target image size;
   b) obtaining integer weight values, each weight value corresponding to each of points uniformly divided between two adjacent pixels, being a value in a range of $0 \sim 2^n$, wherein n is a natural number, and a sum of the weight values between two adjacent pixels is $2^n$; and
   c) producing the target image in the embedded system by obtaining target pixel values of each of the minimum processing units of the target image corresponding to the minimum processing units of the source image by using a source pixel value reflected on a corresponding target pixel value, with the weight value corresponding to a distance with the source pixel.

2. The image scaling method of claim 1, wherein the weight value is obtained from $Vw[i]=(\text{integer cast})(\{Rs \times i - (\text{integer cast})(Rs \times i)\} << n)$, and the target pixel values of each of the minimum processing units of the target image are obtained from $Des[i]=\{(2^n-Vw[i]) \times Src[Index[i]] + Vw[i] \times Src[Index[i+1]]\} >> n$;
   wherein the i is an index for target pixels of the minimum processing units of the target image, Vw[i] is a storage alignment of the weight values, Rs is the ratio of source image size/target image size, n is a natural number, Des[i] is a storage alignment of minimum processing units of the target image, Src[Index[i]] is a storage alignment of minimum processing units of the source image, Index[i] is a storage alignment of source pixel indices as processing standard for producing the target pixels and equals to (integer cast)(Rs×i), <<n is an n-bit shift toward the highest bit, and >>n is an n-bit shift toward the lowest bit.

3. The image scaling method of claim 2, wherein the step of producing the target image comprises the steps of:
   c1) producing an image scaled in the lateral direction by obtaining target pixel values of each of the minimum processing units of the target image corresponding to the minimum processing units of the source image from $Des[i]=\{(2^n-Vw[i]) \times Src[Index[i]] + Vw[i] \times Src[Index[i+1]]\} >> n$ in the lateral direction for each of the pixel rows of the source image; and
   c2) producing the target image by obtaining target pixel values of each of the minimum processing units of the target image corresponding to the minimum processing units of the source image from $Des[i]=\{(2^n-Vw[i]) \times Src[Index[i]] + Vw[i] \times Src[Index[i+1]]\} >> n$ in the longitudinal direction for each of the pixel columns of the image scaled in the lateral direction.

4. The image scaling method of claim 3, wherein the step of obtaining the weight value includes a step of obtaining the index[i].

5. The image scaling method of claim 4, wherein the n is selected from one of 8, 9, and 10.

6. An image scaling method for producing a digital target image by scaling a digital source image in an embedded system, the method comprising the steps of:
   a) determining respective sizes of minimum processing units of a source image and a target image so that the source image and the target image are divided into a same number of minimum processing units in respective lateral and longitudinal direction according to a scaling ratio of the source image size to the target image size;
   b) obtaining integer weight values, each weight value corresponding to each of points uniformly divided between two adjacent pixels, being a value in a range of $0 \sim 2^n$, wherein n is a natural number, and a sum of the weight values between two adjacent pixels is $2^n$; and
   c) producing a target image in the embedded system by obtaining target pixel values of each of the minimum processing units of the minimum processing blocks, each of which is formed by multiplying the minimum processing unit by the minimum processing unit of the target image, corresponding to each of the minimum processing blocks, each of which is formed in a square with each side being a length of one minimum processing unit of the source image, using a source pixel value reflected on a corresponding target pixel value, with a weight value corresponding to a distance with the source pixel.

7. The image scaling method of claim 6, wherein the weight value is obtained from $Vw[i]=(\text{integer cast})(\{Rs \times i - (\text{integer cast})(Rs \times i)\} << n)$, and the target pixel values of each of the minimum processing units of the target image are obtained from $Des[i]=\{(2^n-Vw[i]) \times Src[Index[i]] + Vw[i] \times Src[Index[i+1]]\} >> n$;
   wherein the i is an index for target pixels of the minimum processing units of the target image, Vw[i] is a storage alignment of the weight values, Rs is the ratio of source image size/target image size, n is a natural number, Des[i] is a storage alignment of minimum processing units of the target image, Src[index[i]] is a storage alignment of minimum processing units of the source image, Index[i] is a storage alignment of source pixel indices as processing standard for producing the target pixels and equals to (integer cast)(Rs×i), <<n is an n-bit shift toward the highest bit, and >>n is an n-bit shift toward the lowest bit.

8. The image scaling method of claim 7, wherein the step of producing the target image comprises the steps of:
   c1) producing an image scaled in the lateral direction by obtaining target pixel values of each of the minimum processing units of the target image corresponding to the minimum processing units of the source image from Des[i]={($2^n$−Vw[i])×Src[Index[i]]+Vw[i]×Src[Index[i+1]]}>>n for each of the pixel rows of the minimum processing blocks of the source image; and c2) producing the minimum processing blocks of the target image by obtaining target pixel values of the minimum processing units of the target image corresponding to the minimum processing units of the source image from Des[i]={($2^n$−Vw[i])×Src[Index[i]]+Vw[i]×Src[Index[i+1]]}>>n for each of the pixel columns of the minimum processing blocks scaled in the lateral direction.

9. The image scaling method of claim 8, wherein the step of producing the target image comprises the steps of:
producing the minimum processing blocks of the target image from the start of the source image in the case of down-scaling the source image; and
producing the minimum processing blocks of the target image from the end of the source image in the case of up-scaling the source image.

10. The image scaling method of claim 9, wherein the step of obtaining the weight value includes a step of obtaining the index[i].

11. The image scaling method of claim 10, wherein the n is selected from one of 8, 9, and 10.

12. An image scaling method for producing a digital target image by scaling a digital source image in an embedded system, the method comprising the steps of:
a) determining respective sizes of minimum processing units of a source image and a target image so that the source image and the target image are divided into a same number of minimum processing units in respective lateral and longitudinal directions according to a scaling ratio of the source image size to the target image size;
b) producing a look-up table by obtaining integer weight values, each weight value corresponding to each of points uniformly divided between two adjacent pixels of the source image, being a value in a range of $0 \sim 2^n$, wherein n is a natural number, a sum of the weight values between two adjacent pixels is $2^n$, and by multiplying each of the weight values by each of the pixel values; and
c) producing the target image in the embedded system by obtaining target pixel values of each of the minimum processing units of the target image corresponding to the minimum processing units of the source image by means of processing in reference to the look-up table in order to get the distance of the source image pixel be reflected on the corresponding target pixel values.

13. The image scaling method of claim 12, wherein the weight value is obtained from Vw[i]=(integer cast)({Rs×i−(integer cast)(Rs×i)}<<n ), the look-up table is obtained from Lookup_Table[i][Table_Index]=(Vw[i]×Table_Index)>>n, and the target pixel values of each of the minimum processing units of the target image are obtained from Des[i]=Lookup_Table[i+Const][Src[Index[i]]]+Lookup_Table[i][Src[Index[i]+1]];

wherein the i is an index for target pixels of the minimum processing units of the target image, Vw[i] is a storage alignment of the weight values, Rs is the ratio of source image size/target image size, n is a natural number, Lookup_Table[i]Table_Index] is a look-up table storage alignment including the alignments of index i and index Table_Index for the pixel values which one pixel has, Des[i] is a storage alignment of minimum processing units of the target image, Src[index[i]] is a storage alignment of minimum processing units of the source image, Index[i] is a storage alignment of source pixel indices as processing standard for producing the target pixels and equals to (integer cast)(Rs×i), Const is selected as ½ the size of the minimum processing unit of the target image, the sign is converted, if the index i is greater than ½ the size of the minimum processing unit of the target image, <<n is an n-bit shift toward the highest bit, and >>n is an n-bit shift toward the lowest bit.

14. The image scaling method of claim 13, wherein the step of producing the target image comprises the steps of:
c1) producing an image scaled in the lateral direction by obtaining target pixel values of each of the minimum processing units of the target image corresponding to the minimum processing units of the source image from Des[i]=Lookup_Table[i+Const][Src[Index[]]]+Lookup_Table[i][Src[Index[i]+1]] by processing in reference to the look-up table in the lateral direction for each of the pixel rows of the source image; and
c2) producing the target image by obtaining target pixel values of each of the minimum processing units of the target image corresponding to the minimum processing units of the source image from Des[i]Lookup_Table[i+Const][Src[Index[i]]]+Lookup_Table[i][Src[Index[i]+1]] by processing in reference to the look-up table in the longitudinal direction for each of the pixel columns of the image scaled in the lateral direction.

15. The image scaling method of claim 13, wherein the step of obtaining the weight value includes a step of obtaining the index[i].

16. The image scaling method of claim 15, wherein then is selected from one of 8, 9, and 10.

17. An image scaling method for producing a digital target image by scaling a digital source image in an embedded system, the method comprising the steps of:
a) determining respective sizes of minimum processing units of a source image and a target image so that the source image and the target image are divided into a same number of minimum processing units in respective lateral and longitudinal directions according to a scaling ratio of the source image size to the target image size;
b) producing a look-up table by obtaining integer weight values, each weight value corresponding to each of points uniformly divided between two adjacent pixels of the source image, being a value in a range of $0 \sim 2^n$, wherein n is a natural number, a sum of the weight values between two adjacent pixels is $2^n$, and by multiplying each of the weight values by each of the pixel values; and
c) producing a target image in the embedded system by obtaining target pixel values of each of the minimum processing units of minimum processing blocks, each of which is formed by multiplying the minimum processing unit by the minimum processing unit of the target image, corresponding to each of the minimum processing blocks, each of which is formed in a square with each side being a length of one minimum processing unit of the source image by means of processing in reference to the look-up table in order to get a distance of the source image pixel to be reflected on the corresponding target pixel values.

18. The image scaling method of claim 17, wherein the weight value is obtained from Vw[i]=(integer cast)({Rs×i−(integer cast)(Rs×i)}<<n ), the look-up table is obtained from Lookup_Table[i][Table_Index]=(Vw[i]×Table_Index)

>>n, and the target pixel values of each of the minimum processing units of the target image are obtained from Des[i]Lookup_Table[i+Const][Src[Index[i]]]+Lookup_Table[i][Src[Index[i]+1]];

wherein the i is an index for target pixels of the minimum processing units of the target image, Vw[i] is a storage alignment of the weight values, Rs is the ratio of source image size/target image size, n is a natural number, Lookup_Table[i][Table_Index] is a look-up table storage alignment including the alignments of index i and index Table_Index for the pixel values which one pixel has, Des[i] is a storage alignment of minimum processing units of the target image, Src[index[i]] is a storage alignment of minimum processing units of the source image, Index[i] is a storage alignment of source pixel indices as processing standard for producing the target pixels and equals to (integer cast)(Rs×i), Const is selected as ½ the size of the minimum processing unit of the target image, the sign is converted, if the index i is greater than ½ the size of the minimum processing unit of the target image, and <<n is an n-bit shift toward the highest bit, and >>n is an n-bit shift toward the lowest bit.

19. The image scaling method of claim 18, wherein the step of producing the target image comprises the steps of:

c1) producing an image scaled in the lateral direction by obtaining target pixel values of each of the minimum processing units of the target image corresponding to the minimum processing units of the source image from Des[i]=Lookup_Table[i+Const][Src[Index[i]]]+Lookup_Table[i][Src[Index[i]+1]] by processing in reference to the look-up table for each of the pixel rows of the minimum processing blocks of the source image; and c2) producing the minimum processing blocks of the target image by obtaining target pixel values of the minimum processing units of the target image corresponding to the minimum processing units of the source image from Des[i]=Lookup_Table[i+Const][Src[Index[i]]]+Lookup_Table[i][Src[Index[i]+1]] by processing in reference to the look-up table for each of the pixel columns of the minimum processing blocks scaled in the lateral direction.

20. The image scaling method of claim 19, wherein the step of producing the target image comprises the steps of:

producing the minimum processing blocks of the target image from the start of the source image when downscaling the source image; and producing the minimum processing blocks of the target image from the end of the source image when upscaling the source image.

21. The image scaling method of claim 20, wherein the step of obtaining the weight value includes a step of obtaining the index[i].

22. The image scaling method claim 21, wherein the n is selected from one of 8, 9, and 10.

* * * * *